United States Patent
Angrilli et al.

(10) Patent No.: US 7,333,675 B2
(45) Date of Patent: Feb. 19, 2008

(54) METHOD AND DEVICE FOR EXTRACTING A SUBSET OF DATA FROM A SET OF DATA

(75) Inventors: Riccardo Angrilli, Pescara (IT); Renzo Liberato Arce Arguedas, Vaiano Cremasco (IT); Eros Pedrini, Monte Cremasco (IT); Andrea De Marchi, Rivolta d'Adda (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 695 days.

(21) Appl. No.: 10/937,808

(22) Filed: Sep. 9, 2004

(65) Prior Publication Data
US 2005/0063589 A1   Mar. 24, 2005

(30) Foreign Application Priority Data
Sep. 9, 2003   (EP)   ................................. 03425577

(51) Int. Cl.
*G06K 9/46*   (2006.01)
(52) U.S. Cl. ........................ 382/282; 382/173; 382/289
(58) Field of Classification Search ................ 382/173, 382/289
See application file for complete search history.

(56) References Cited

U.S. PATENT DOCUMENTS

| | | | |
|---|---|---|---|
| 2001/0003168 A1 | 6/2001 | Breed et al. | 701/45 |
| 2002/0159635 A1* | 10/2002 | Hill et al. | 382/173 |
| 2003/0071817 A1 | 4/2003 | Sidwell | 345/520 |

OTHER PUBLICATIONS

Kroemker, Graphische Datenverarbeitung: Raster-Algorithmen, Lecuture on Graphical Data Processing, 2003, pp. 1-19, available at www.agc.fhg.de.

* cited by examiner

*Primary Examiner*—Samir Ahmed
*Assistant Examiner*—John W Lee
(74) *Attorney, Agent, or Firm*—Lisa K. Jorgenson; Allen, Dyer, Doppelt, Milbrath & Gilchrist, P.A.

(57) ABSTRACT

A method for extracting a subset of data from an ordered set of bi-dimensional matrices (data arrays) such as a sequence of pictures or a multi-dimensional matrix, for instance, is implemented by dedicated hardware that may be used each time it is necessary to extract a subset of data from a data array. For each matrix of data, the method calculates very quickly row and column indices of border data of the portion to be extracted, which are obtained by arithmetical operations among row and column indices of vertices of a closed area of interest. The method is implemented in a device for selectively transferring a data stream sampled at a certain bit-rate to a microprocessor unit or to a memory receiving the data stream at a different rate.

18 Claims, 15 Drawing Sheets

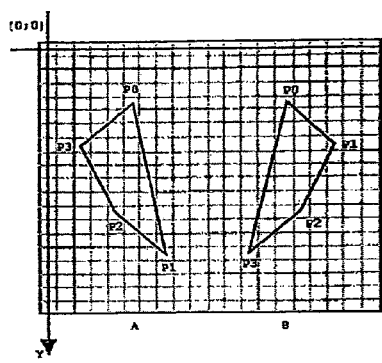
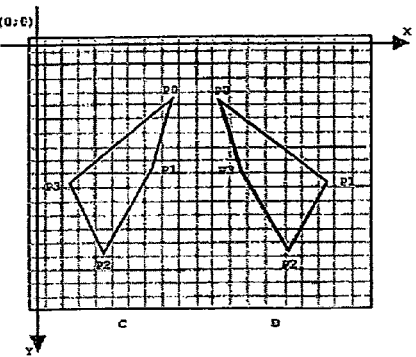
FIG. 10a      FIG. 10b
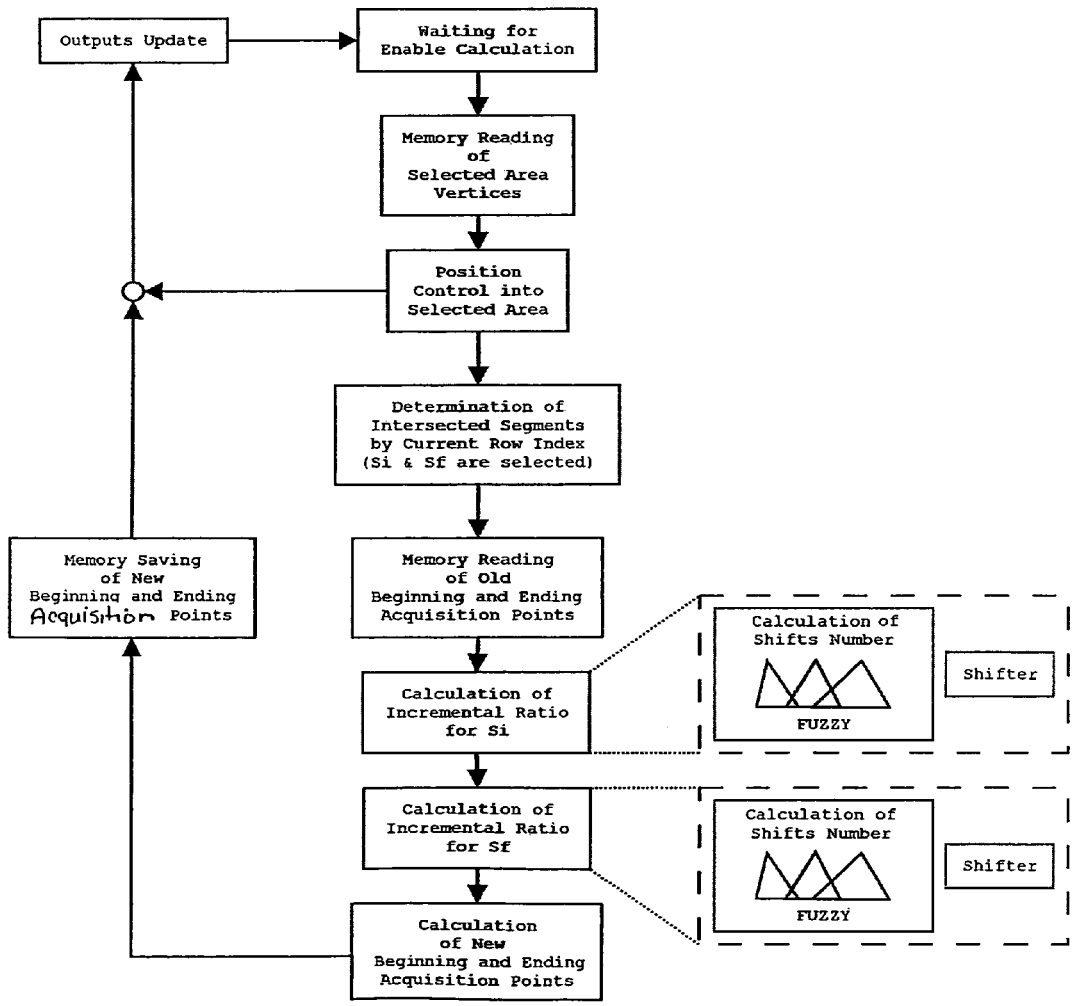
FIG. 11

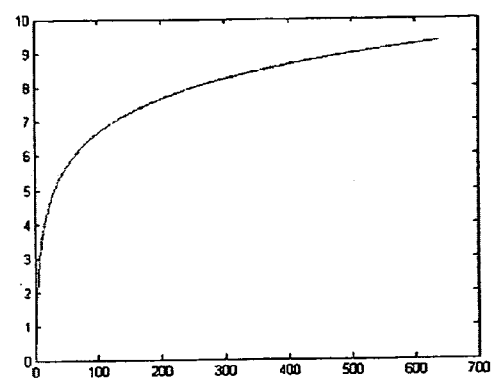
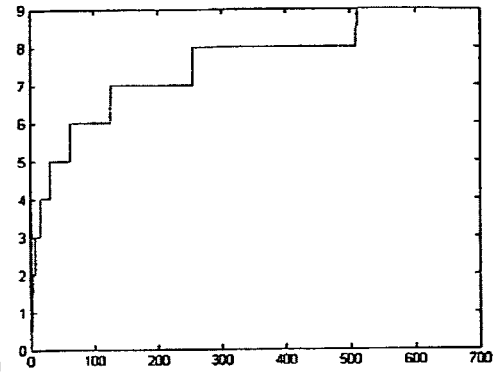
FIG. 13a  FIG. 13b
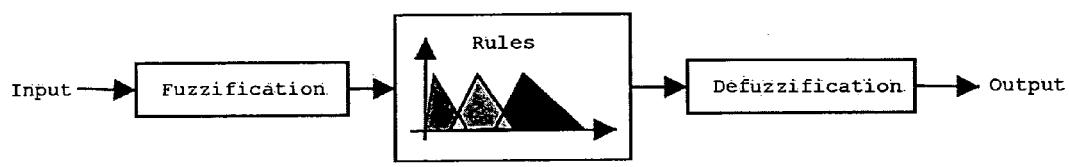
FIG. 14
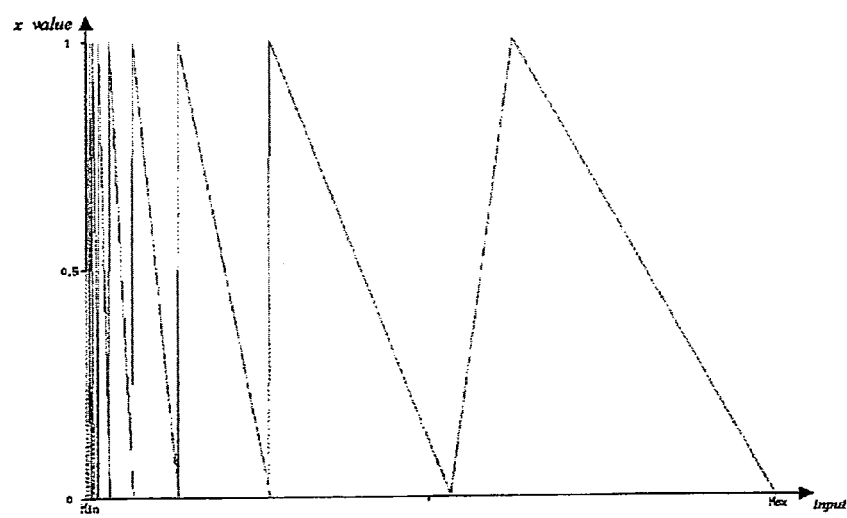
FIG. 15

METHOD AND DEVICE FOR EXTRACTING A SUBSET OF DATA FROM A SET OF DATA

FIELD OF THE INVENTION

The present invention relates to the processing of data, and more precisely, to a method and device for extracting a subset of data from a data array that may be used in digital picture processing.

BACKGROUND OF THE INVENTION

In analyzing and processing data acquired in real time from external sources, it may often be useful and/or efficient to process only a portion of the data relative to a certain set of data that may be recursively acquired, such as data relative to a certain limited area of images acquired in sequence (video images), for example. This way of operating is common in many applications, such as in the following: quality analysis systems, security overseeing systems (environmental, territorial, etc.), safety systems, biomedical survey, and automotive.

The processing of acquired matrices of data (data arrays) requires a calculation power proportioned to their size. However, in certain applications or for certain objectives, the analysis and the processing could be limited to specific portions of sets of data organized in matrices, i.e., of data-arrays, instead of processing whole data-arrays to reduce the calculation power required.

Clearly, such a selection of a limited portion of each acquired data array will depend on the specific needs and on the objectives of the application. In case there are sets of data that are recursively updated, such a selection is performed only after having acquired all the data. This implies the use of a system designed ad hoc, which results in a waste of time and resources that limits enhancement of overall process speed. In fact, a non-negligible portion of the calculated power performs the extraction operation.

The portion of data to be extracted is often predefined, therefore, the selection parameters that identify it are stored. Selection parameters include a first row of the portion to be extracted of the data-array, the number of rows of the portion, the column index of a first value of the first row, the number of values of the row to be considered and (in case the perimeter segments of the region to be selected are not orthogonal to the reference axis of the data-array) also the slope of the perimeter segments, and the number of values to be extracted. Of course, for each row of the selected portion, it is thus necessary to identify these values and calculate the positions of other data to be extracted. The more numerous the distinct portions to be extracted results in, more sets of selection parameters being stored.

SUMMARY OF THE INVENTION

An object of the invention is to provide a method for extracting a subset of data from an ordered set of bi-dimensional matrices (data-arrays), such as a sequence of pictures or a multi-dimensional matrix, for instance. The method is implemented via dedicated hardware that may be used each time it is necessary to extract a subset of data from a data-array.

Even if the method is applied to a set of data that may be organized according to any geometric scheme, very often the data to be processed are organized in matrices generated by a bi-dimensional array of pressure sensors, such as in the case of pixel data of picture frames of pressure distribution images.

The peculiarity of the method of the invention allows, for each matrix of data, a very quick calculation of row and column indices of border data of the portion to be extracted, which are obtained by fast approximated arithmetical operations among row and column indices of vertices of closed area of interest.

According to the method for extracting a portion of data, each row (or column) that intercepts the portion of data to be extracted from each data array is scanned, and for each row (or column) at least a location of border data belonging to or lying on a perimeter segment of the portion of data to be extracted is identified. This is done by approximately calculating an integer incremental ratio characterizing the perimeter segment joining two consecutive vertices of the portion of data to be extracted, and identifying a column index of border data belonging to the next row as a function of this integer incremental ratio and of its sign.

Another object of the invention is to provide a device for implementing the method of the invention for selectively transferring a data stream sampled at a certain bit-rate to a microprocessor unit or to a memory unit receiving the data stream at a different rate.

BRIEF DESCRIPTION OF THE DRAWINGS

The different aspects and advantages of the invention will be even more evident through a detailed description referring to the attached drawings, wherein:

FIGS. 10a and 10b depict particular cases of portions of data to be extracted from a data array in accordance with the present invention;

FIG. 11 depicts a general flow chart for extracting a selected portion of data from a data array in accordance with the present invention;

FIGS. 13a and 13b compare the graphs of the logarithm function to the base 2 with an approximate step diagram of the same function in accordance with the present invention;

FIG. 14 depicts a basic scheme of a fuzzy system in accordance with the present invention;

FIG. 15 defines a member function of the fuzzification block of the fuzzy system of FIG. 14 for approximating the logarithm function in base 2;

DETAILED DESCRIPTION OF THE PREFERRED EMBODIMENTS

The method of the invention allows the extraction of a portion of data from a data array of any size. Any set of data may be considered as an ordered set of bi-dimensional matrices of data, and for the sake of simplicity, the method of the invention will be described by referring to data organized in bi-dimensional matrices. However, the method is applicable to any organized set of data, even in a multi-dimensional matrix (e.g., a tri-dimensional lattice) simply by repeating the process steps for each bi-dimensional matrix that composes the multi-dimensional matrix.

Figure 1:
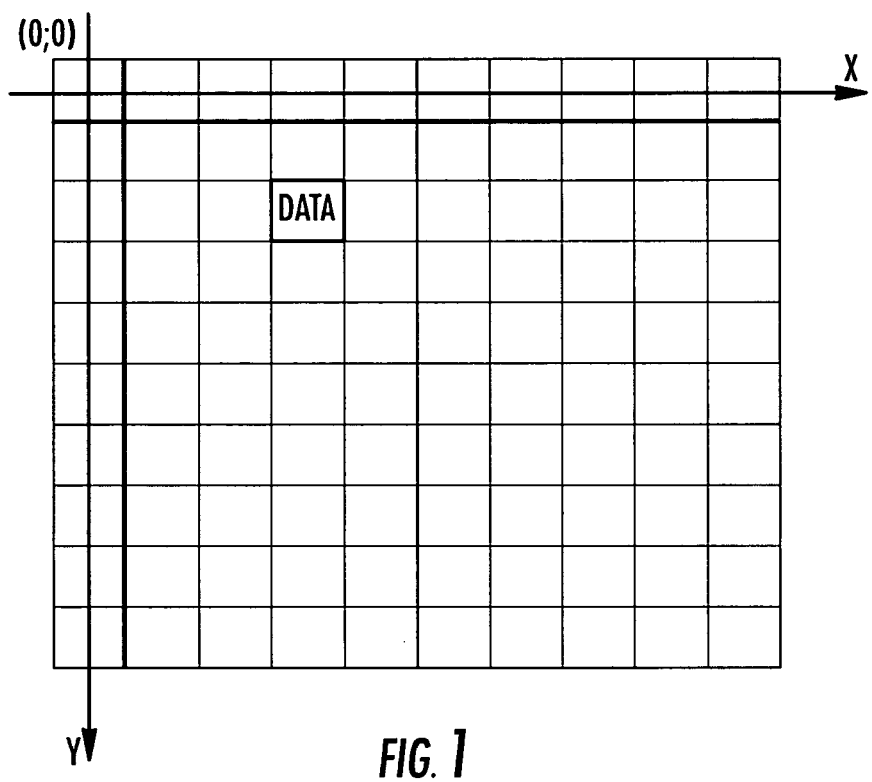
FIG. 1 shows data within a bi-dimensional data array in accordance with the present invention.

An example of a bi-dimensional matrix of data (data-array) is depicted in FIG. 1. Each data is identified in a Cartesian plane by a row index y and a column index x. A bi-dimensional matrix may represent luminance values of pixels of a picture, or data generated by an array of pressure sensors and alike devices, for instance.

Figure 2A:
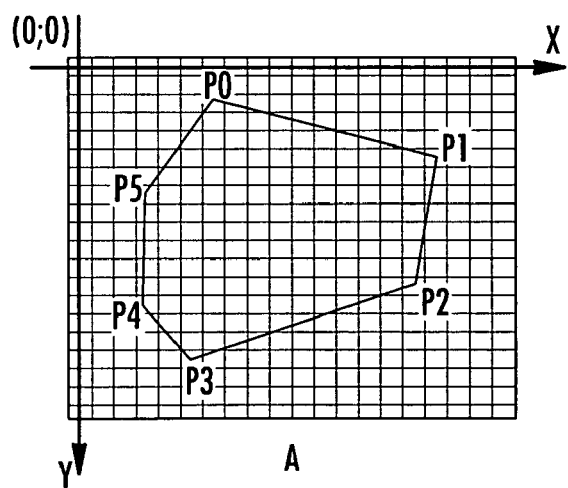
FIGS. 2a and 2b show how a portion of data to be extracted is identified by border data on each scanned row in accordance with the present invention.
Figure 2B:
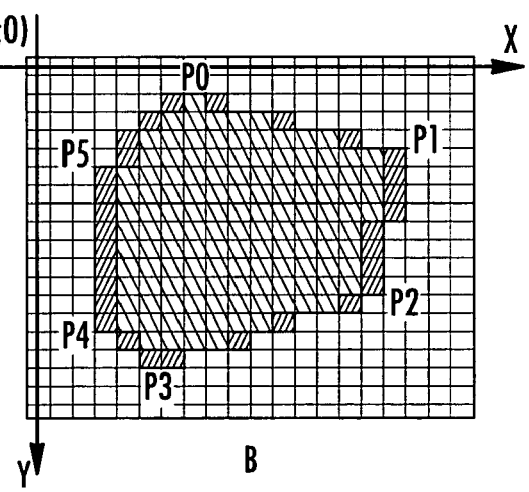

Suppose that a subset of data as the one indicated in FIG. 2a is to be extracted. Any portion of data contained in a bi-dimensional matrix may be located by knowing the coordinates (row and column indices) of its vertex data, namely: P0, . . . , P5, that are specified while acquiring the data, and by the coordinates of border data identified by the dark cells of FIG. 2b lying along perimeter segments of the area of interest.

All these coordinates may assume only integer values, and the invention provides an efficient and fast method for calculating them. First, it is necessary to identify the location of vertex data of the portion to be extracted either in a clockwise or counterclockwise order, and to find the vertex data having the largest and the smallest row indices. Then, the rows of the bi-dimensional matrix between the largest and the smallest row indices are to be scanned one by one, and for each row at least border data is to be located, that is, a data lying on a perimeter segment joining two vertex data.

Once all rows have been scanned, the desired portion of data is obtained by extracting the sub-set of data bordered by the border data. Only the portion of interest is extracted, thus saving calculation power which otherwise would be wasted for processing a large number of non required data.

Thus, the objective is determining for each row the location of data lying on a perimeter segment joining two consecutive vertices. A line joining two points P1 and P2 on a Cartesian plane is defined by a constant coefficient and an angular coefficient.

The angular coefficient $m_x$, which is the incremental ratio referred to the x axis, is:

$$m_x = \frac{x_1 - x_2}{y_1 - y_2} \qquad (1)$$

where $x_1$ and $y_1$ are the column and row indices of the data located at point P1, and similarly, $x_2$ and $y_2$ are the corresponding indices of the data located at point P2. The angular coefficient $m_y$, which is the incremental ratio referred to the y axis, is calculated according to the following formula:

$$m_y = \frac{1}{m_x} \qquad (2)$$

To locate border data, it is necessary to calculate the ratio given by eq. (1) or by eq. (2), and this takes a relatively long time if performed according to known methods.

The invention comprises calculating the sign of the incremental ratio with respect to the x or y axis and in approximating the absolute value of the denominator with a power in base two raised to an integer exponent. This is to obtain these ratios conveniently by loading a binary string representing the numerator in a shift register, and by performing a right shift by a number of bits corresponding to the integer exponent. Right shifting is a much faster operation than calculating a ratio and increases the rate of data extraction.

Row and column indices are always integer numbers, thus in general approximations they are needed. In fact, if the slope of a perimeter segment is ±45°, as in the sample of FIG. 3b, border data lying on it are identified in succession by increasing or decreasing by one the row and column indices of one of the two vertices, up to the other vertex.

Figure 3A:
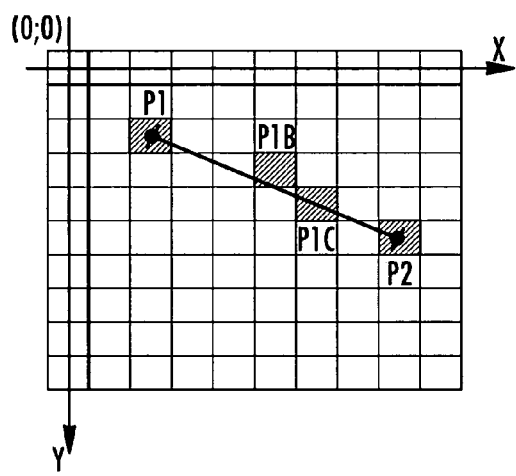
FIGS. 3a, 3b and 3c show how border data lying along a perimeter segment are located according to a preferred embodiment of the present invention.
Figure 3B:
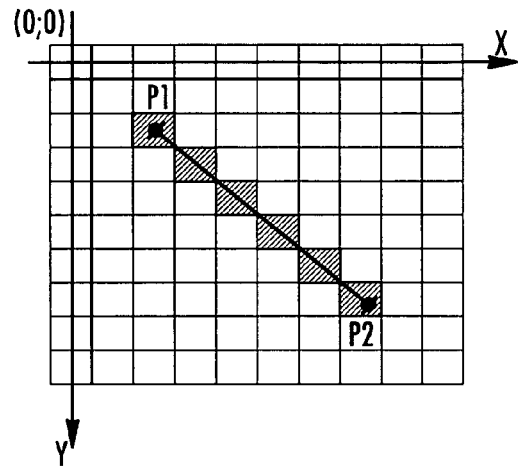
Figure 3C:
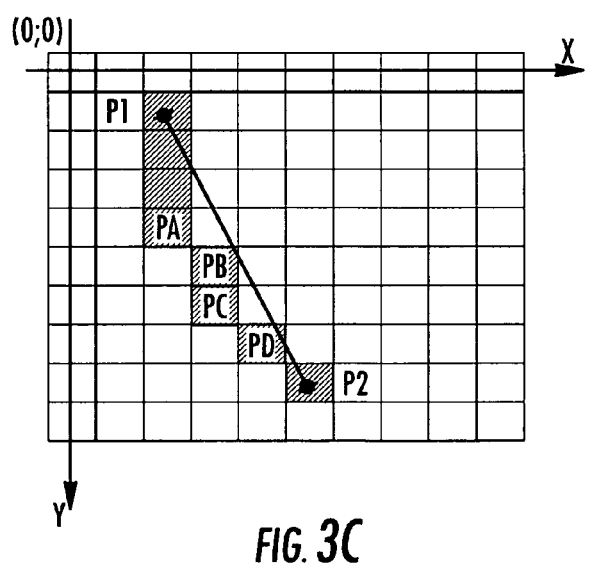

In contrast, when the slope of the segment is different from ±45° and is not null (vertices on the same row) nor infinite (vertices on the same column), as in the examples of FIGS. 3a and 3c, it is necessary to make approximations for calculating row and column indices of the border data. In these cases, approximating the increment of the row or column index by one, when in reality it is a fraction thereof, may lead to a non-negligible final error.

According to the invention this problem is addressed as follows. Consider a row comprised between the largest and the smallest row indices of the vertices of the portion to be extracted, and the perimeter segments of the portion to be extracted intercepted by it. For each intercepted segment, a respective pair of consecutive vertices is identified and for each pair of consecutive vertices P1, P2 the differences between column $(x_2-x_1)$ and rows $(y_2-y_1)$ indices are calculated. The difference of the smallest absolute value is approximated with a power in base two raised to an integer exponent, and the incremental ratio $m_x$ or $m_y$ is calculated as the ratio between the difference of largest absolute value and the power in base two. Finally, border data on the considered row are located by calculating the respective column indices as a function of such a calculated incremental ratio.

To better illustrate how these column indices are calculated according to a preferred embodiment of this invention, the method is applied to the segment of FIG. 3a. Suppose that vertex data is at point (location) P1, the coordinates of which are (2, 2) and another vertex data is at point (location) P2 the coordinates of which are (8, 5), as depicted in FIG. 3a. In this case, $x_1=2; y_1=2; x_2=8; y_2=5.$ The first border data having the smallest row index is at point P1. Then the differences between the row and column indices are calculated, obtaining respectively:

$\Delta y=(y_2-y_1)=3; \Delta x=(x_2-x_1)=6$

The value of the column index of the border data of the next row depends on whether the incremental ratio has been calculated referring to the x or y axis, and on its value. If $|\Delta x| \geq |\Delta y|$ then the location of the border data of the next row is obtained by summing the currently stored column index with the integer incremental ratio.

In contrast, if $|\Delta x| < |\Delta y|$ as in the example of FIG. 3c, locations of border data are identified as these selected by keeping constant the column index for a number of rows corresponding to the incremental ratio $m_y$, then the column index is incremented or decremented by one depending on whether $\Delta x$ is positive or negative. In this case, there will be border data lying on the same column for a number of rows defined by $m_y$.

Therefore, the values of $\Delta x$ and $\Delta y$ are updated and the algorithm continues by performing the above described operations using the new values of $\Delta x$ and $\Delta y$ and considering as border data the data identified by the currently stored column index and by the row index $y_1+m_y$.

The absolute value of the difference between the row indices for the case of FIG. 3a is the smallest, and so it is approximated with a power in base two raised to an integer exponent. For instance, this approximation may be performed by truncation:

$|\Delta y|=3=2^{1.5849...} \cong 2^1$

The integer incremental ratio is thus:

$$m_x = \frac{\Delta x}{\Delta y} = \frac{(x_2-x_1)}{(y_2-y_1)} \cong 3 \qquad (3)$$

The location of the border data of the successive row is calculated by summing the currently stored column index, which is 2 (that is, the column index of P1), with the integer incremental ratio, and the result is 5.

The currently stored row index is incremented by one (2+1=3) and it is tested for determining if the new index is equal to the row index of the vertex data P1, otherwise the same process steps are carried out.

The point P1B located by the currently stored row and column indices (5, 3) is selected as new border data. The values of $\Delta x$ and $\Delta y$ are updated, obtaining $\Delta x=\Delta x-m_x=3; \Delta y=\Delta y-1=2.$ The smallest of these two values is approximated with a power in base two raised to an integer exponent by truncation $\Delta y=2=2^1$ and the ratio between $\Delta x$ and $\Delta y$ is calculated, eventually truncating it if the result is not an integer number:

$$m_x = \frac{\Delta x}{\Delta y} = \frac{3}{2} \cong 1 \qquad (4)$$

The reason why it is preferable to approximate the incremental ratio by truncation will be explained later.

Similarly, the currently stored row index is incremented by 1 (3+1=4) and it is tested to determine whether it is equal or not to the row index of the vertex data P2. A new column index is stored by incrementing the currently stored column index by the value of equation 4 (5+1=6), the row index is incremented by one and the point P1C is selected as new border data located by the currently stored column and row indices (6, 4).

The values of $\Delta x$ and $\Delta y$ are again updated, as shown above, obtaining:

$\Delta x=2; \Delta y=1$

The row index of the next row coincides with the value of the row index of the vertex data P2. Therefore, the vertex P2 is directly selected as border data. This is made possible through a preliminary control between the index of the currently scanned row and the row index of the vertex P2.

The algorithm continues by processing the point P2 and the location of the next vertex data along another perimeter segment (if present). In summary, by applying the method of the invention to the segment located by the vertices P1 and P2 the points P1B and P1C are also identified as border data, besides the vertices themselves, as depicted in FIG. 3a.

The reason why it is preferable to truncate the integer incremental ratio is the ease of calculation that is achieved. In fact, given that the denominator of the integer incremental ratio is a power in base two raised to an integer exponent, truncation of the quotient may be carried out by representing the numerator in binary form and right shifting it for a number of bits corresponding to the integer exponent. Right shifting is a much faster operation than calculating a quotient. Moreover, an incremental ratio should be calculated repeatedly many times among row and column indices of two points for extracting a selected portion of a frame or data array. Thus, the method of the invention reduces noticeably the time required for this operation.

Referring to the sample segment of FIG. 3c, the vertices of which are the points P1≡(2, 1) and P2≡(5, 8), for which is $|\Delta x| < |\Delta y|$ with $\Delta x=(x_2-x_1)=3$ and $\Delta y=(y_2-y_1)=7$, and contour data are indicated by the gray cells.

Border data may be located in this case by choosing for each scanned row data in the same column of P1 until the border data $P_A$ is reached, the coordinates of which are $(x_1, y_1+m_y)$, wherein:

$$m_y = \frac{|y_1-y_2|}{|x_1-x_2|} = \frac{7}{3} \cong \frac{\text{``111''}}{2^1} = \text{``11''} = 3$$

with "111" and "11" being the binary strings representing the numbers 7 and 3.

Differently from what has been done referring to the case of FIG. 3a, the value of $m_y$ is obtained as the ratio between absolute values because it should not be a negative number. In fact, the value of the column index is left unchanged with respect to that of the data P1 for a positive number (three) of consecutively scanned rows corresponding to the integer incremental ratio $m_y$. This may be conveniently performed by loading the value of $m_y$ in an auxiliary register, the content of which is decremented while the index of the row to be scanned is incremented.

For the case of FIG. 3a, at each cycle of the algorithm the values of Δx and Δy are updated: Δy is decremented by one at each cycle, while Δx is decremented by one only at the end of the last (third) cycle. The current values of Δx and Δy after $m_y$ cycles are:

Δx=2; Δy=4.

When the point $P_A$≡(2, 4) is reached, the column index is incremented by one for the next row, locating the point $P_B$, the coordinates of which are $(x_1+1, y_1+m_y+1)$≡(3,5).

The algorithm continues and the new values of Δx and Δy are processed $$m_y = \frac{|\Delta y|}{|\Delta x|} = \frac{4}{2} = \frac{\text{``100''}}{2^1} = \text{``10''} = 2$$

The value of the column index ($x_1$+1) remains unchanged for two consecutive rows: the first is the row that contains the point $P_B$, the second is the row that contains the point $P_C$, the coordinates of which are $(x_1+1, y_1+m_y+2)$≡(3,6), which is another border data.

The values of Δx and Δy are updated and become:

Δx=1; Δy=2 and at the new cycle the following ratio is calculated:

$$m_y = \frac{|\Delta y|}{|\Delta x|} = \frac{2}{1} = \frac{\text{``10''}}{2^0} = \text{``10''} = 2$$

By repeating the process steps illustrated above, the border data $P_D$≡(4, 7) is located by incrementing by one the row and column indices of the point $P_C$. The value of Δy is updated by decrementing it by one, while Δx remains unchanged. At the next cycle, the index of the currently scanned row is the row index of the vertex data P2, thus the point P2 is identified as border data without performing any calculation.

Whether the border of the subset of data to be extracted is convex or concave, it is necessary to perform the process steps for each single segment of the perimeter intercepted by the scanned row. In this way, the border data of the selected zone are determined by a single row-wise scanning. Conveniently, the vertices of the region are provided in clockwise or counterclockwise order.

Although the method of the invention has been described for the case of a row-wise scanning of a data-array, any skilled person will immediately understand that alternatively the method may be performed by scanning the data array in a column-wise fashion by repeating all the operations exchanging the roles of row and column indices.

Another aspect of the invention is that of approximating the smallest absolute value of the differences between the column and row indices with a power in base two raised to an integer exponent ($2^n$). The best way of calculating is by approximating the exponent n for an acceptable error.

As already mentioned, the exponent n is calculated by approximating the logarithm in base two of the denominator. The result of the logarithm function is very unlikely to be an integer. According to the invention, it is imperative to work with integer numbers, and the following three options are possible: truncating; rounding to the smallest larger integer; and rounding to the nearest integer.

The error for each approximation rule may be evaluated. An error function calculates the row and column indices of points lying on a straight segment, for instance the segment joining the points P1≡($x_1$, $y_1$) and P2≡($x_2$, $y_2$) of FIG. 4.

Figure 4:
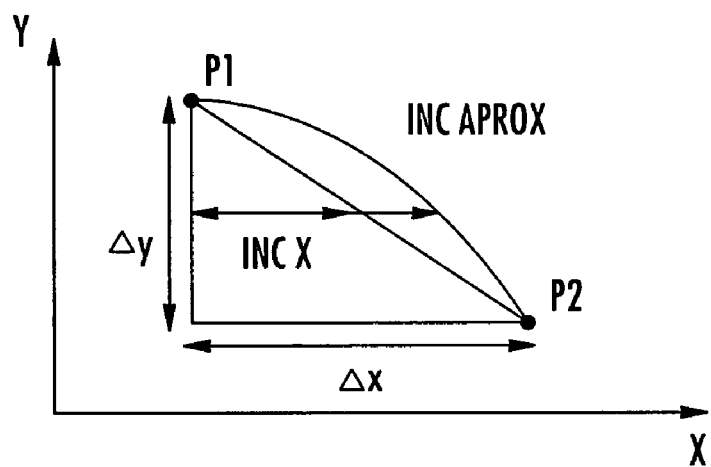
FIG. 4 shows a curve that approximates the segment joining the vertices P1 and P2 in accordance with the present invention.

FIG. 4 exemplifies the case in which the absolute value of the difference between the column indices of P1 and P2 is larger than the difference between the absolute value of the difference between row indices, and thus the number n is obtained by calculating the logarithm in base 2 of the module of the difference between row indices $|y_1-y_2|$. However, the same considerations apply also for the opposite case.

Calculating an approximated value for n, the result will be an increment $inc_{aprox}$ generally different from the increment $inc_x$ that would be obtained without any approximation. With Δx=$x_2$-$x_1$; Δy=$y_2$-$y_1$ the relative error $err_{rel}$ caused by approximating the real increment $inc_x$ with $inc_{aprox}$, is $$err_{rel} = \frac{inc_{aprox} - inc_x}{\Delta x} = \frac{\frac{\Delta x}{2^n} - \frac{\Delta x}{\Delta y}}{\Delta x} = \frac{1}{2^n} - \frac{1}{\Delta y} = \frac{\Delta y - 2^n}{2^n \cdot \Delta y} \quad (5)$$

that does not depend on Δx and diminishes when Δy grows.

With no intention of limiting this analysis, attention may be focused on the case in which the dimensions of the data array are that of a VGA frame. To be able to illustrate graphically the results of an analysis performed using the tool Matlab™, the following approximation rule applies: truncating, n=Inf{$\log_2$ Δy}.

According to this approximation rule, border data column indices will be larger than those of corresponding points of a straight perimeter segment if its slope is between −45° and +45°, and if the slope is greater than +45° the column indices will be smaller that the corresponding points of a straight perimeter segment. Generally this rule leads to selection of a region that approximates in excess the region of interest. This rule represents the best approach because it is generally important to extract the whole region of interest without leaving out any data pertaining to it.

Figure 5:
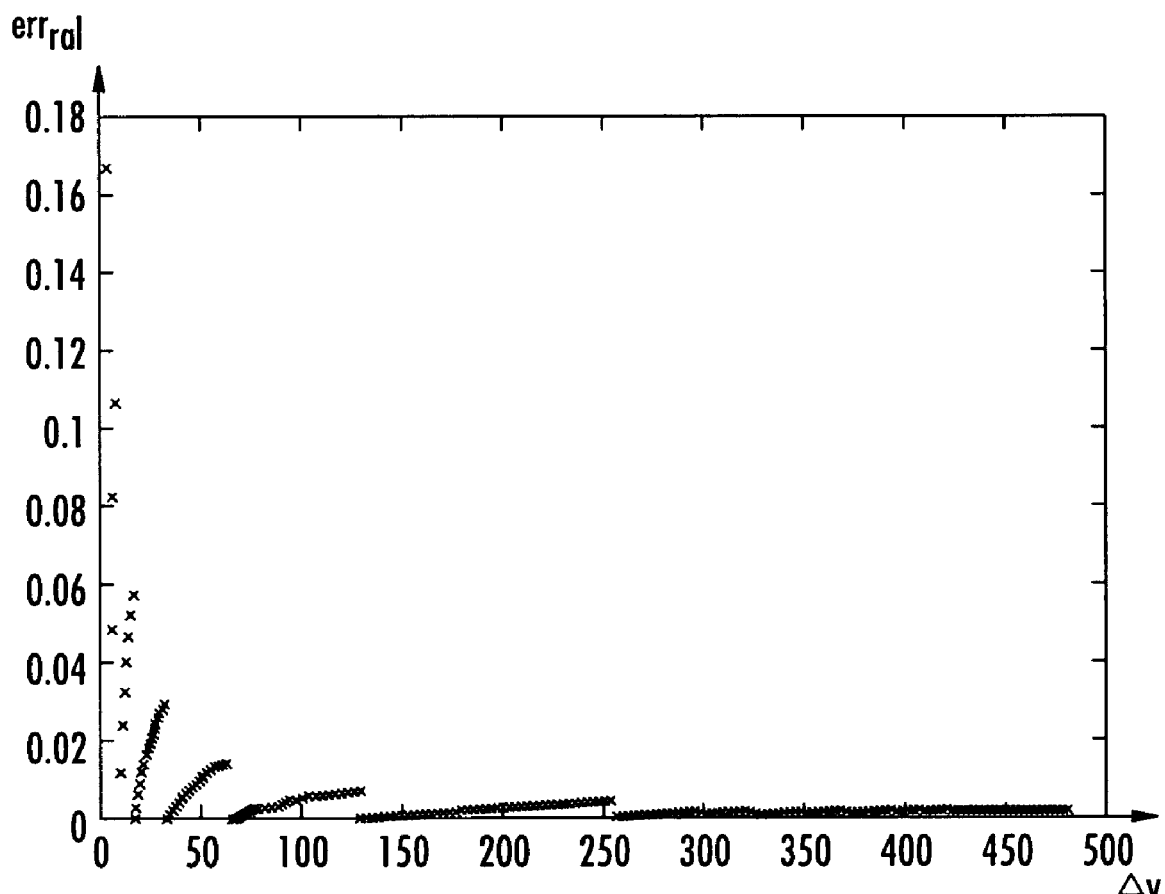
FIG. 5 is a graph of the relative local error made by truncating decimals in accordance with the present invention.

FIG. 5 depicts the relative local error caused by truncation. The error is quite small, less than 3% for Δy in the interval [20; 30], less than 2% for Δy in the interval [30; 65], less than 1% for Δy in the interval [65; 125], less than 0.5% for Δy in the interval [125; 260] and less than 0.25% for Δy comprised in the interval [260; 480]. The smaller the values, the more consistent the error becomes. For instance, the error has a maximum value of 6% for the interval [10, 20] in the vicinity of Δy=20.

The worst case is for Δy=3 with an error of 17%. This is not a problem because detecting a region with a vertical displacement between two consecutive vertices of just three lines, maybe with a much larger horizontal displacement (of two or three orders of magnitude), implies that the perimeter segment is almost flat (slope of few degrees) and only few data are selected in excess of those that would be ideally necessary.

Another rule is rounding to the smallest larger integer, with n=Sup{log$_2$ Δy}. This rule represents the dual of the previous rule, but generally the selected region is internal to the desired one, with a consequential loss of data pertaining to the region of interest.

Figure 6:
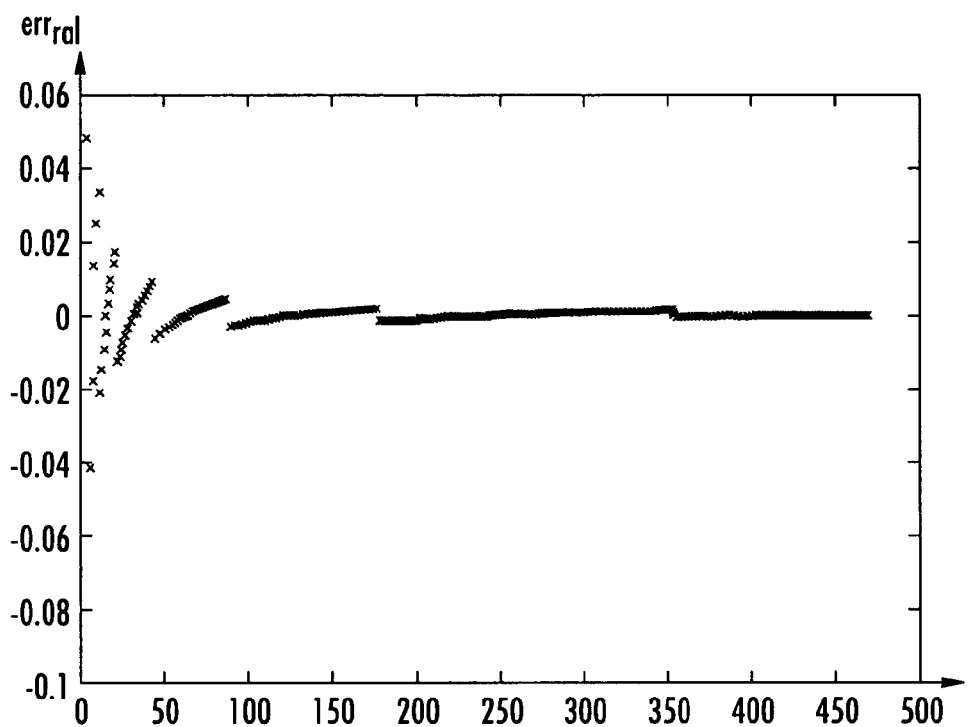
FIG. 6 is a graph of the relative local error made by rounding values to the nearest integer in accordance with the present invention.

Another rule is rounding to the nearest integer, with n=Round{log$_2$ Δy}. This third alternative rule of approximation represents an intermediate approach between the two preceding rules, but it does not allow one to know before hand whether the column index of the border data identified on the currently scanned row is larger than or smaller than that of a corresponding point belonging to a straight segment. The relative local error for this rule is shown in FIG. 6.

Figure 7:
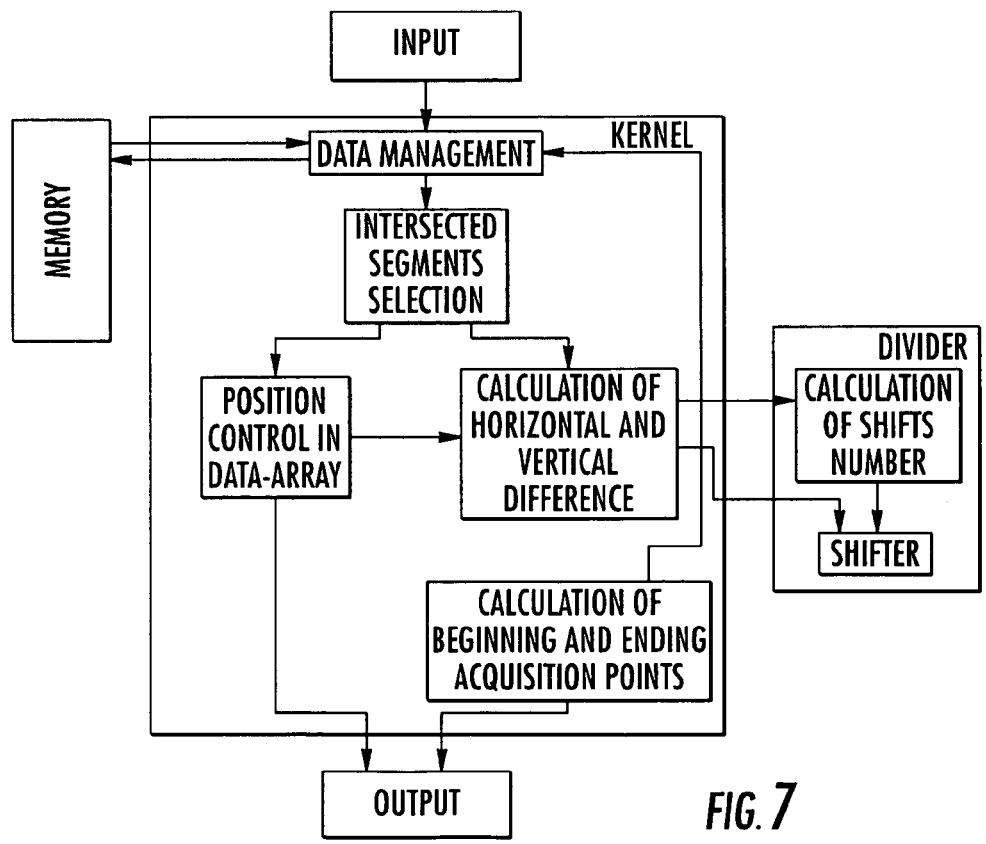
FIG. 7 is a high level block diagram of a device implementing the method of the present invention.

FIG. 7 is a basic block diagram of a device implementing the method of this invention. Basically, it comprises the following five functional blocks. The input block is an input interface with the external world. It receives the data of the vertices that locate a selected area of data to be extracted and manages data of the device.

The memory block is a support memory that is used for saving information necessary for performing the various calculations and for storing the results. For example, the memory stores data relative to incremental ratios and the location of the current start and end points of acquisition, and the vertices of the area of data to be extracted, etc.

The output block is an interface that outputs the results of the calculated location of the data of interest. An external system coupled thereto will know whether a scanned location belongs to the region of interest and depending on this information, may acquire the selected data. Preferably, the block provides also a validity flag of the output values.

The divider block is a functional block that calculates the quotients. The block comprises a sub-block and a shift register. The sub-block calculates the number of right shifts (integer exponent number of the power in base two that approximates the denominator) that should be done for approximating the ratio. It is input with the denominator of the incremental ratio. The shift register SHIFTER that divides the numerator of the integer incremental ratio by a power in base two. It is input with the numerator and the integer exponent number calculated by the sub-block that is upstream.

The kernel is the logic core of the device. It cooperates with the above described blocks for performing the process steps of the method of the invention. It receives from the block INPUT the coordinates of the vertices (of the vertex locations) of the region to be extracted, calculates the perimeter (interpolating) straight segments thereof and verifies whether or not the scanned row intercepts the zone of interest. If that is the case, it calculates the incremental ratios and the coordinates of new border data, the previous values of which are stored in the memory block MEMORY. The block KERNEL comprises the following sub-blocks:

Data Management: saves in and recovers from the block MEMORY data of interest;

Intersected Segments Selection:, calculates, from the coordinates of the vertices, parameters representative of the interpolating straight segments that border the region of the data to be extracted;

Position Control in Data-array: detects whether data of a scanned row pertain to the region of interest. If so, this condition is signaled to the block Calculation of Horizontal and Vertical Difference;

Calculation of Horizontal and Vertical Difference: calculates the numerator and denominator of the incremental ratio for perimeter segments intercepted by the scanned row. The results are fed to the block DIVIDER; and Calculation of Beginning and Ending Acquisition Points: determines, for a scanned row, the respective points of beginning and ending acquisition, in terms of coordinates relative to the data-array. These values are also stored for successive evaluation.

Figure 8:
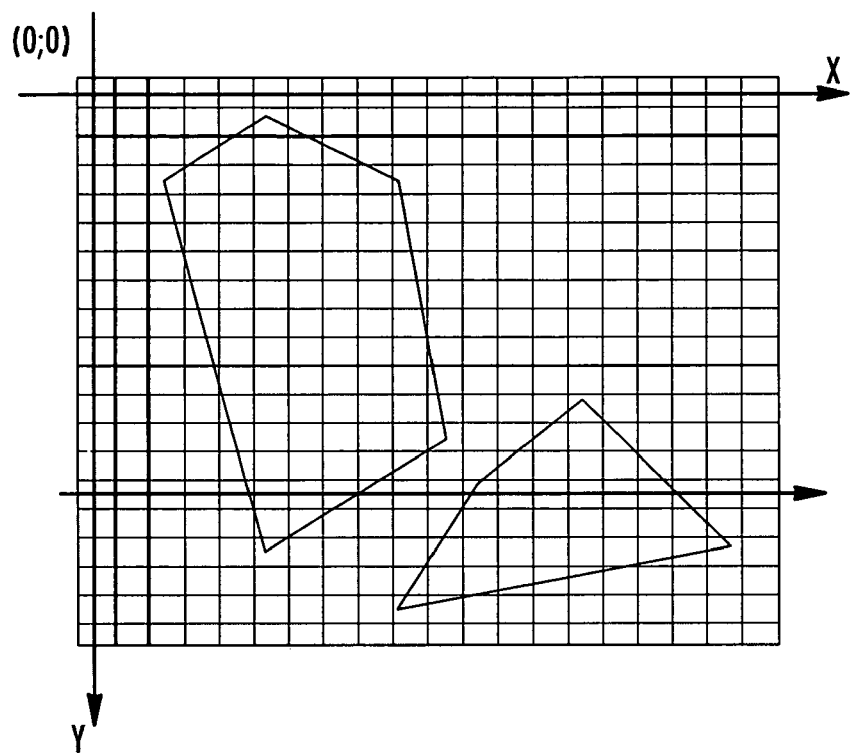
FIG. 8 shows two portions of data to be extracted from the same data array in accordance with the present invention.

The system has many advantageous features. One is the use of an additional DIVIDER that allows calculation of the locations of beginning and ending acquisition points in parallel. This advantageously reduces the time needed by simply introducing a second DIVIDER module. Should a plurality of distinct portions of data needed to be extracted, as many devices may be used in parallel. This is particularly convenient when two (or more) distinct regions that are all intercepted by a certain group of rows (or of columns) are selected, as shown in FIG. 8, and it is necessary to calculate the locations of points of beginning and ending acquisition for each portion. By using two devices of the invention in parallel, each of them will operate on only one portion, thus halving the processing time.

Figure 9:
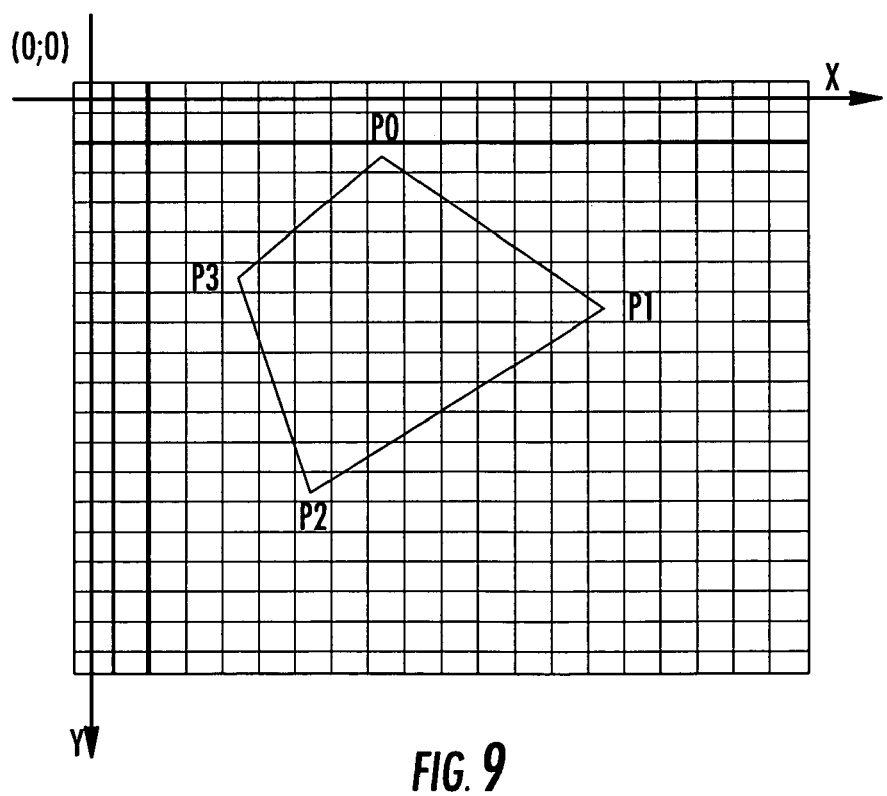
FIG. 9 depicts a portion of data to be extracted that is confined in a quadrilateral in accordance with the present invention.

A detailed embodiment of the method of the invention referred to the particular case of the extraction of data pertaining to a convex side region of a bi-dimensional data array will now be described. By way of example, the portion of data within the quadrilateral perimeter of FIG. 9 is extracted. The data array is supposed to be scanned in a row-wise mode and for each row the locations of pertinent data to be acquired are identified.

To this end the following are required: the coordinates of the vertices of the region of the data array containing the data to be extracted as input parameters to be preferably provided in a clockwise or counterclockwise order starting from that with the smallest row index y, the index of the row currently being scanned, and an enabling flag for storing the coordinates of the vertex data and for calculating the coordinates of the border data of the portion of interest belonging to the currently scanned row. Beside these data, also provided are flags for signaling that the scanned row is entirely outside the region of interest, that acquisition for the current data array is complete, and for enabling the reading of all border data.

As far as the calculation of the number of right shifts to be performed is concerned a fuzzy logic technique is used that will be described later. The algorithm contemplates the determination of slopes and is capable of managing the extraction of portions of a data array of any shape and size, including the particular cases exemplified in FIGS. 10a and 10b. Of course it is also possible to extract triangularly shaped portions of a data array.

Figure 12A:
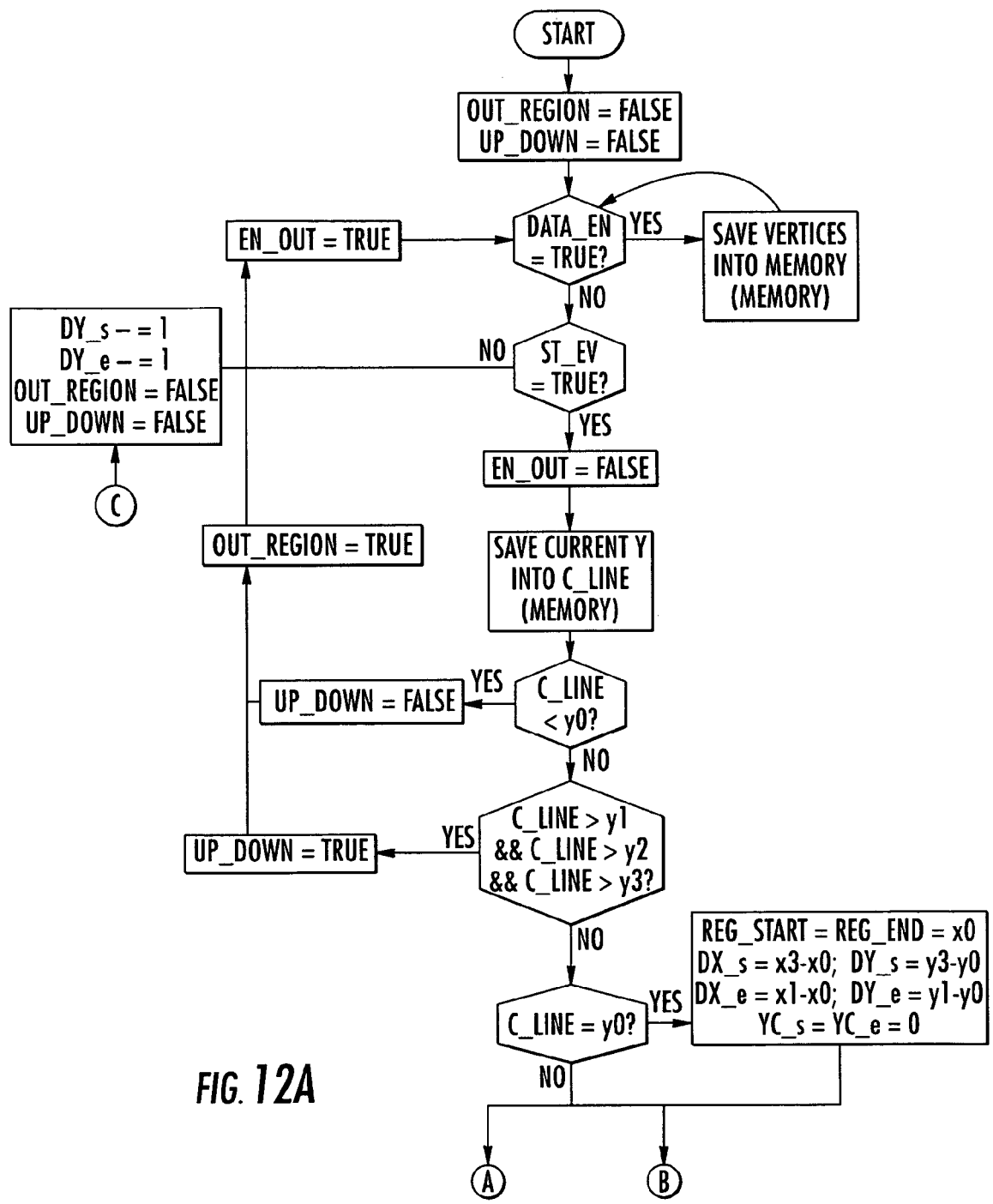
FIGS. 12a, 12b and 12c depict detailed flow charts of the method of the invention for extracting the subset of data identified in FIG. 9 or for the particular cases of FIG. 10.
Figure 12B:
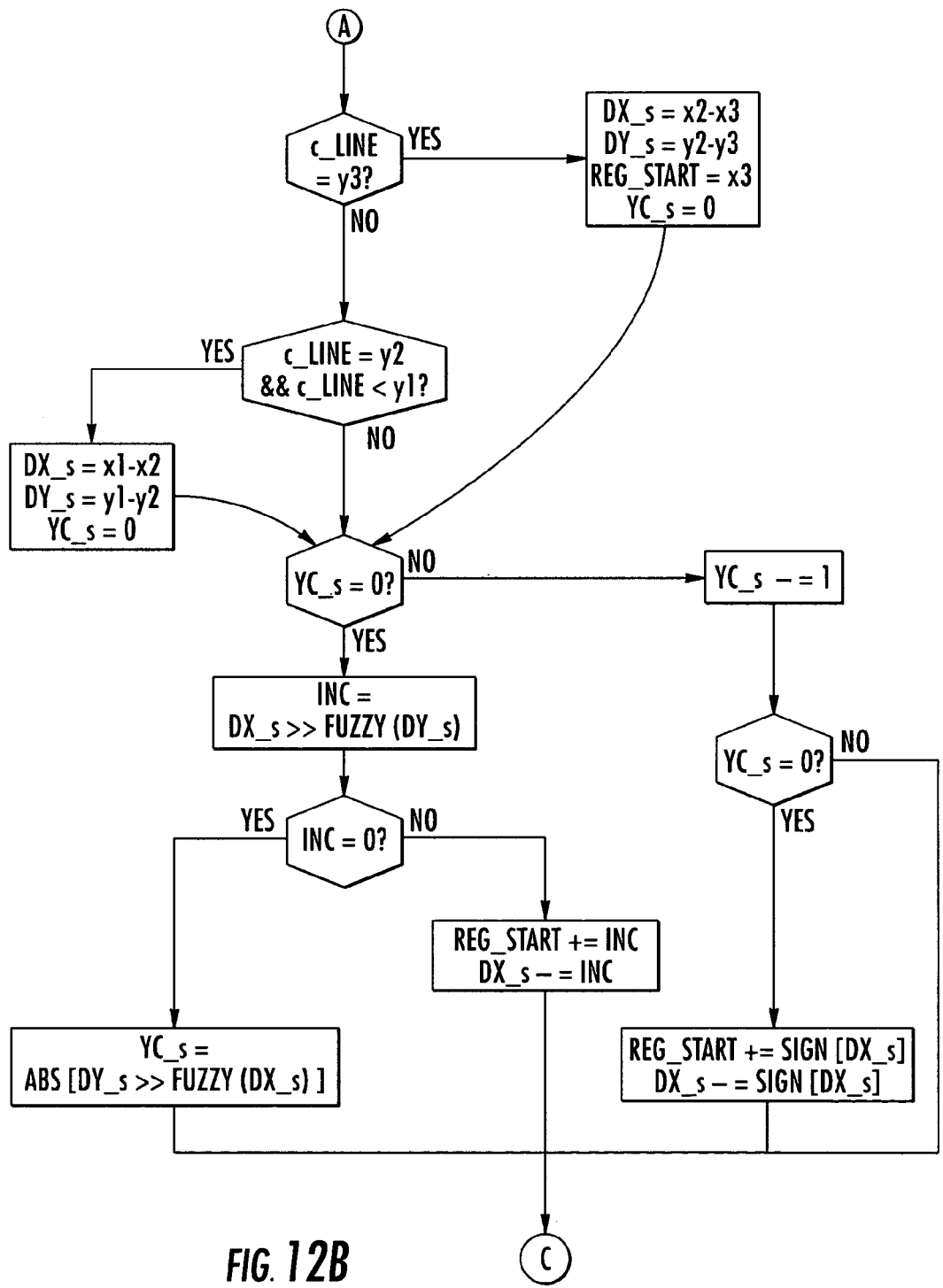
Figure 12C:
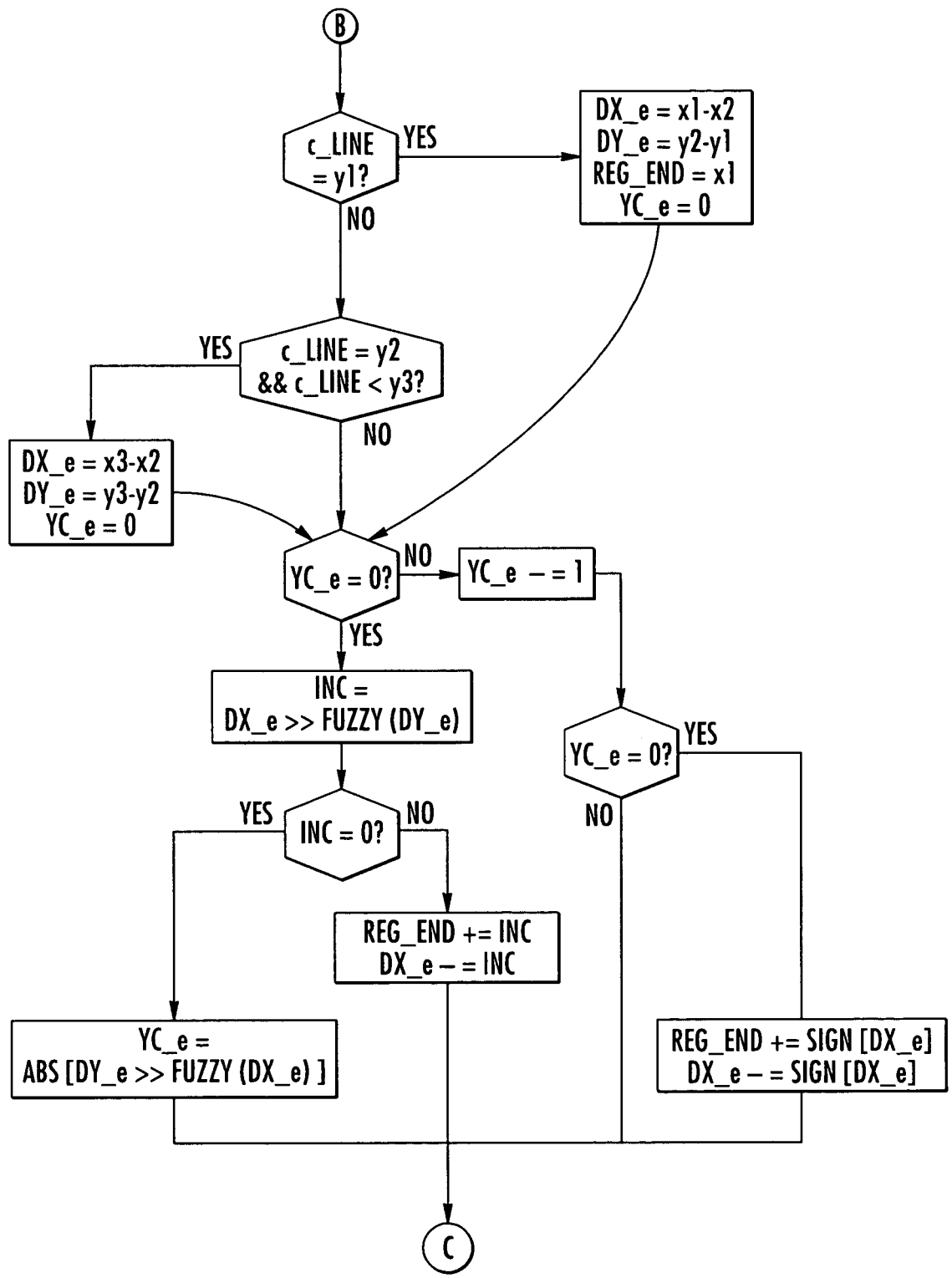

A general flow chart of the operations to be performed for extracting a selected portion of data is depicted in FIG. 11, while FIGS. 12a, 12b and 12c show detailed flow charts of an algorithm of the invention for extracting the portion of FIG. 9, that contemplates the following input data:

c_line counter of the currently scanned row index;

st_ev calculation request flag for the line pointed by C_line;

$(x_0, y_0)$, $(x_1, y_1)$, $(x_2, y_2)$, $(x_3, y_3)$ coordinates of the vertex data of the portion of data array to be extracted;

data_en enabling flag for storing locations of vertices;

and the following output data:

reg_start column index (abscissa coordinate) of the beginning of acquisition for the currently scanned row;

reg_end column index (abscissa coordinate) of the ending of acquisition for the currently scanned row;

out_region flag indicating that c_line is outside the acquisition zone;

up_down flag indicating that c_line is above the acquisition region (and thus it is a flag that signals the end of the acquisition); and en_out flag indicating that the output data are coherent with the above signals.

In the block MEMORY of FIG. 7, there are internal registers for storing intermediate data that are generated during the execution of the algorithm, such as:

DX_s, DY_s increments of the start registers (beginning of the acquisition interval) for the x and y coordinates, respectively;

DX_e, DY_e increments of the end registers (ending of the acquisition interval) respectively for the x and y coordinates, respectively; and YC_s, YC_e support registers for processing perimeter segments having a slope greater than 45°.

A fuzzy(.) logic system calculates according to a fuzzy algorithm the logarithm in base two of increments DX_s, DY_s, DX_e, DY_e. This fuzzy logic system is contained in the block DIVIDER together with the shift register SHIFTER that performs the shift operations indicated in FIGS. 12b and 12c by the symbol >>. The block KERNEL logic contains circuits for performing elementary functions (at software level as well as at hardware level) such as: an adder; a circuit for outputting the sign of a value; and a circuit for outputting the absolute value.

Certain controls of the position of the scanned row with respect to the region of interest are performed in the initial part of the algorithm, which is repeated at each cycle. If the row being scanned is a first row of the region (e.g., the vertex data with the smallest y coordinate belongs to the row, in the example of FIG. 9), certain values in the block MEMORY are initialized and successively, in the block KERNEL with the cooperation of the block FUZZY, the increments of the registers reg_start and reg_end for the current row are calculated. Moreover, in this section the slope of the interpolating segment joining two successive vertices is established, as already explained.

The operations of increment or decrement are briefly indicated with the symbols +=and −=, respectively, and such a notation means that the variable on the left side of the symbol is either incremented or decremented by the quantity on the right side of the symbol. The absolute value is calculated by the function abs[.] The function sign[.] is 1 or −1 depending on whether its argument is positive or negative. The logic AND operation is indicated with the symbol &&.

The diagrams of FIGS. 12a, 12b and 12c are immediately understood for a skilled person in light of the example of applying the algorithm to the sample cases of FIGS. 3a and 3c, and will not be discussed in further detail.

A very convenient way of calculating a logarithm in base two through a fuzzy logic algorithm implemented by a fuzzy logic system will now be described. The fuzzy system used approximates the function $n=\text{Inf}\{\log_2 \Delta y\}$ in the domain of integer numbers (FIG. 13), and is included in the approximation block of the divider of the device.

The fuzzy logic system conjugates two basic requirements: obtaining the best possible result (minimizing the approximation error); and having the least complex implementation to achieve a reactively fast response without burdening the overall system of which it forms a module. The fuzzy logic system may have the classic configuration of FIG. 14.

Merely for illustrative purposes, reference will be made to a data array the size of which coincides with that of a VGA frame. The fuzzification block employs the member function shown in FIG. 15, composed of triangular memberships areas that subdivide the input domain according to the mathematical definition of $\log_2 x$. This choice has been made considering also the operations to be performed by the defuzzification block in order to write straightforward and comprehensible rules that are evaluated quickly.

The input domain subdivision used for generating the memberships is defined in the following Table 1.

TABLE 1

| From | To | Name of the member function |
|---|---|---|
| 0 | 1 | area0 |
| 2 | 3 | area1 |
| 4 | 7 | area2 |
| 8 | 15 | area3 |
| 16 | 31 | area4 |
| 32 | 63 | area5 |
| 64 | 127 | area6 |
| 128 | 255 | area7 |
| 256 | 511 | area8 |
| 512 | 1023 | area9 |

Figure 16:
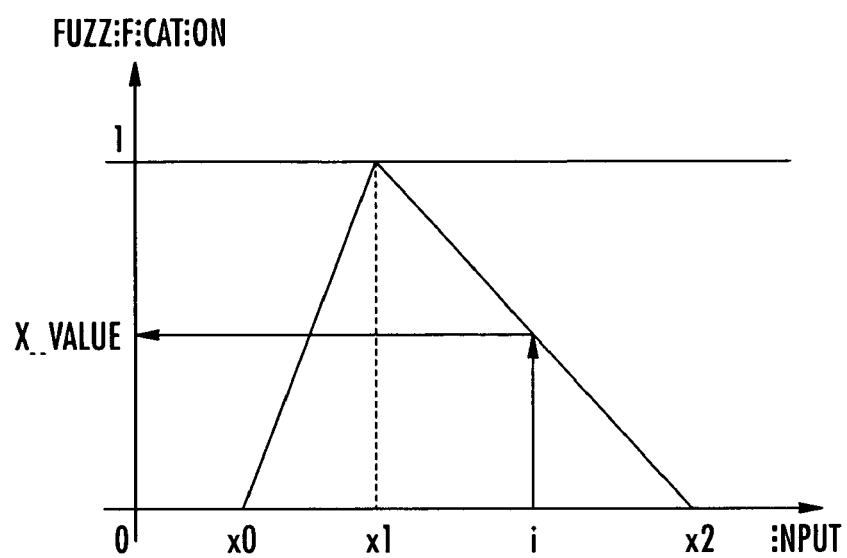
FIG. 16 shows an example of a triangular membership function for performing a fuzzification operation in accordance with the present invention.

For optimizing the membership a "tool free" software for Unix-like systems, called XFuzzy, developed by the "Instituto de Microelectronica de Sevilla" has been used. The memberships were chosen to be triangular shape because they had proved to be the least complex among the memberships that would allow a perfect subdivision of the domain. Each of these memberships is defined by few elements to be stored (the three values that define the triangle are x0, x1 and x2), and the fuzzification operation is very simple because each membership is composed of only two segments (see FIG. 16).

Figure 17:
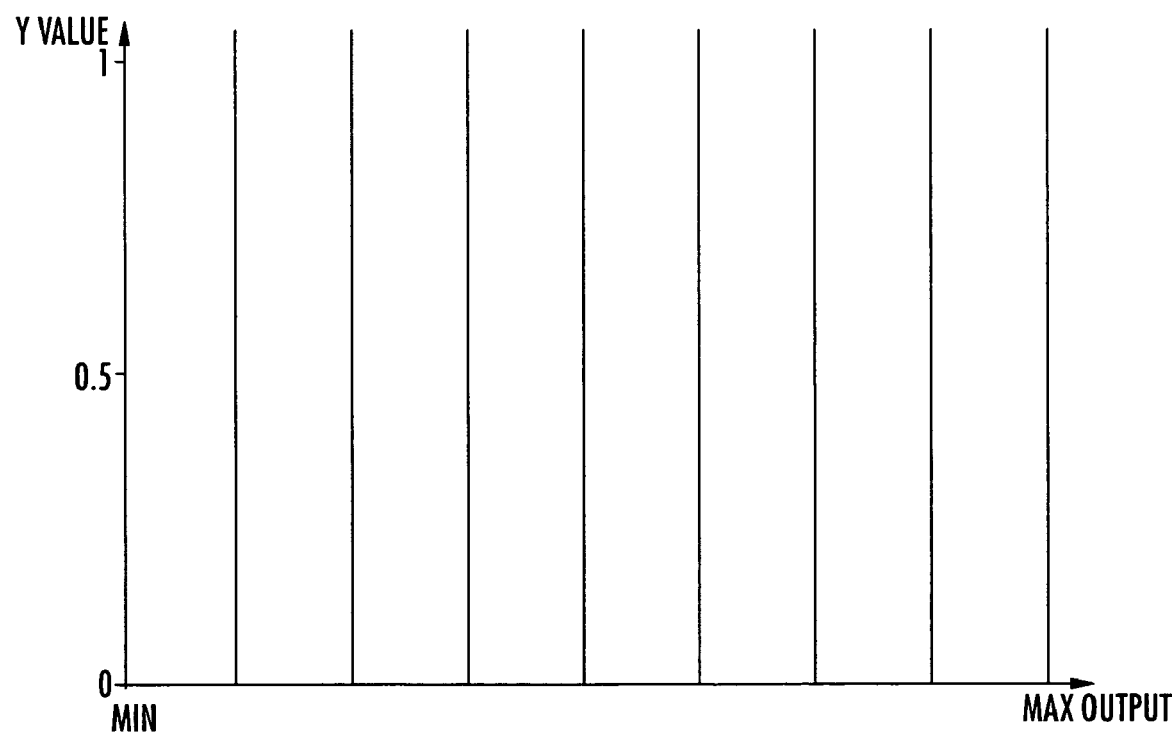
FIG. 17 defines the de-fuzzification block of the fuzzy system of FIG. 14.

The defuzzification block is formed by a single member function depicted in FIG. 17, composed of impulsive memberships centered around the output values. The decision block is composed of a set of rules that associate the input memberships with the output memberships, nullifying the error. The rules have an antecedent and a single consequent, and realize a bi-unique link between fuzzification and defuzzification sets: IF $X_{value}$ IS IN $area_i$ THEN $Y_{value}$ IS $\log_j$ wherein $area_i$ is the fuzzification membership and $\log_j$ the defuzzification membership.

Of course, the system, like all fuzzy systems, should be dimensioned considering both the domain/co-domain of the input/output values and the number of necessary memberships. This number is very limited with respect to the number of input/output values.

What has been said for a convex region, as that of FIG. 9, may be repeated also for more complex figures, such as concave regions, because by configuring in parallel more devices of FIG. 7, it is possible to treat them as composed of convex regions and to process each convex component region by a respective device of the many functioning in parallel.

The invention is useful in the field of digital picture processing, such as in devices for aiding a car driver or in monitoring systems (environmental, territorial, etc.), for instance. These devices as well as many others manage data streams in real time, that is, data transfer from a peripheral to the core of the device or between two peripherals. Besides, it is often necessary or advantageous to select a certain subset of data to be transferred rather than transferring a whole set of data.

Usually some of these peripherals are slower than others or than the processing core, and therefore, they perform polling and/or interrupt operations. As it is well known, during these operations, any other processing step must be suspended, thus slowing the whole system and resulting in a significant waste of available resources.

Introduction of interfaces between two peripherals or between a peripheral and the processing core of the system capable of selecting data and making easier their transfer, may sensibly enhance global performances. In fact, the core of the system, in these conditions, may carry on with the processing of the data, without being stopped for managing the timing of requests coming from relatively slow peripherals and/or from the block employed for selecting in real time the data of interest. In this way, it is no longer necessary to store a whole set of data for later selecting the one of interest.

In classical systems, use of interfaces between the processor and peripherals is often necessary. The known approaches require that these interfaces be substantially dependent from the central processing unit that is thus involved in each data transfer notwithstanding the use of interfaces. Given that these transfers take place through relatively slow buses, the central processing unit cannot perform any other task whenever a data transfer is required.

This drawback is normally solved by creating and managing queues of data via hardware or software, letting the various circuit blocks work at their proper speed, but the problem arises when managing the queue besides the transmission.

A typical drawback of picture processing systems includes requiring intermediate memory buffers for storing data for the time taken by the central processing unit to perform tasks of higher priority before completing the required data transfer.

The rate adapting interface of the invention has the capabilities of allowing a first manipulation of the data being transmitted. In particular, the device is capable of receiving data in different formats (nibble or parallel) and of reconstructing the data to be sent by structuring them in a plurality of different formats, depending on the different needs that from time to time emerge. An important difference from known interfaces is that the interface device of the invention allows data transfer to be performed without requiring any control from a central processing unit.

Figure 18:
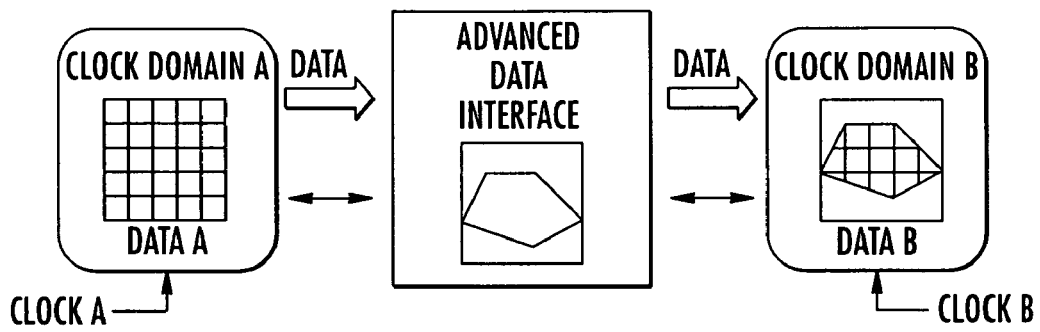
FIG. 18 shows schematically the operations performed by the selective transfer device ADVANCED DATA INTERFACE in accordance with the present invention.

The selective transfer device ADVANCED DATA INTERFACE of FIG. 18 allows data to selectively transfer between two devices working at different clock frequencies.

Data belonging to a matrix Data A are sampled in synchronization with the clock signal Clock A, filtered through a selection module, transferred and synchronized with the clock signal Clock B. The black arrows indicate schematically an exchange of control signals between functional blocks.

Figure 19:
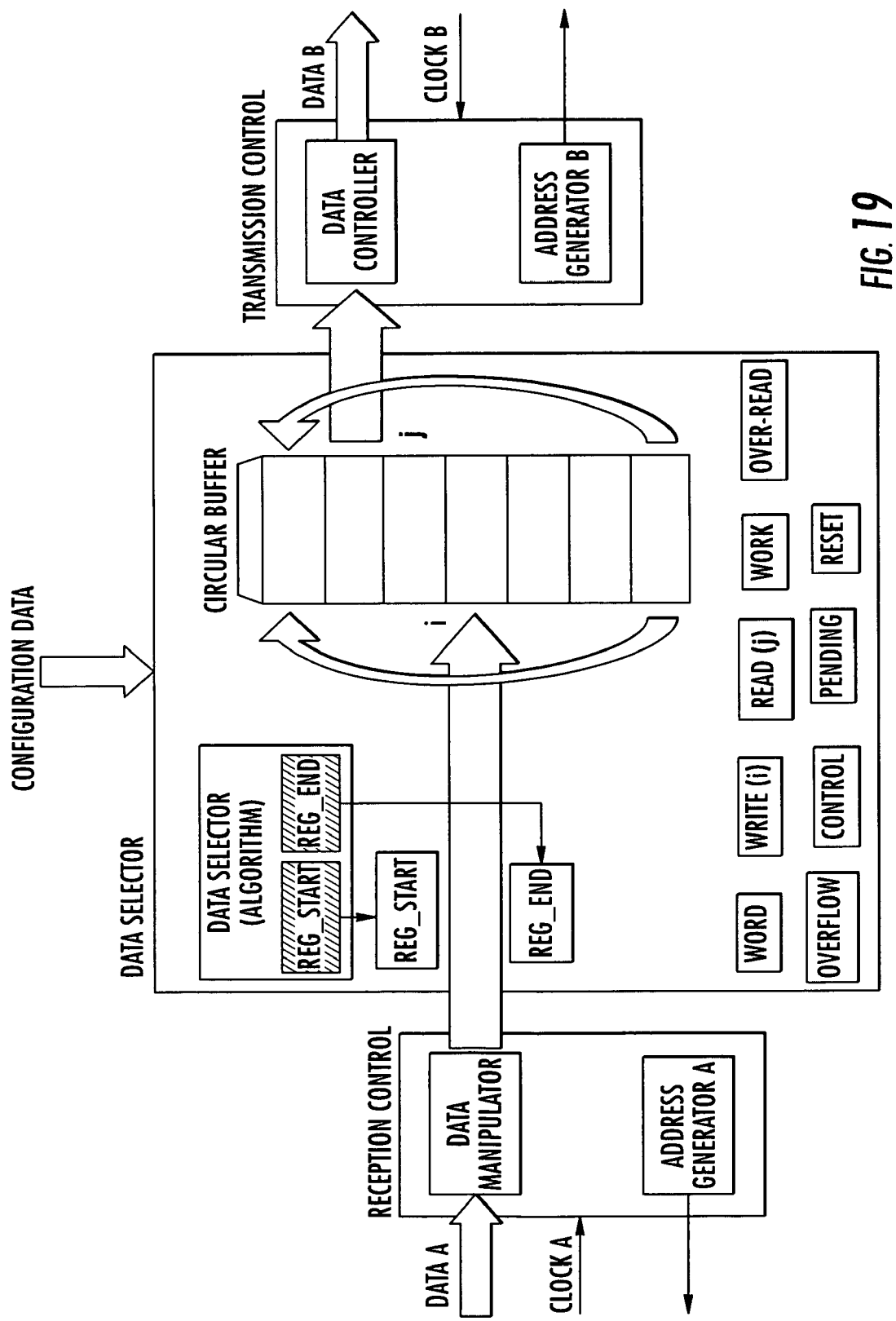
FIG. 19 shows in greater detail the architecture of the selective transfer device ADVANCED DATA SELECTION of FIG. 18.

FIG. 19 is a high level diagram of the selective transfer device of the invention. The block RECEPTION CONTROLLER may acquire data belonging from a data array n×m encoded in nibbles or words, up to a maximum of l bits synchronized on the trailing, leading or both edges of the clock signal Clock A. Moreover, the device dynamically generates addresses of the rows of interest of the data array through the block ADDRESS GENERATOR A.

In so doing it is possible to pre-select data to be transferred. The encoded data are transmitted to the block DATA SELECTOR. The block DATA SELECTOR allows the selection of a portion of data from the data array by defining a polygonal selection window. Preferably, the polygonal window is defined without involving the processing unit, thus leaving it free continue the processing of data in real time.

A data queue manager ensures that data to be transferred is always aligned even if the transmission and reception devices work at different clock frequencies. Data are stored temporarily in a memory unit BUFFER, the size of which is tied to the number of data to associate at each transfer and to the ratio between the transmission rate of the transmitter and the receiving rate of the receiver.

The transmission is performed by groups of data, the size of which is predefinable. The size of the memory is accurately calculated to prevent loss of information for overflow. According to the invention, the block TRANSMISSION CONTROLLER outputs data belonging to a "selected" portion of the data array in a certain format and synchronized to the signal Clock B. These data are transmitted to destination addresses that are dynamically generated by the block ADDRESS GENERATOR B, at each address corresponding to a row of data.

Figure 20:
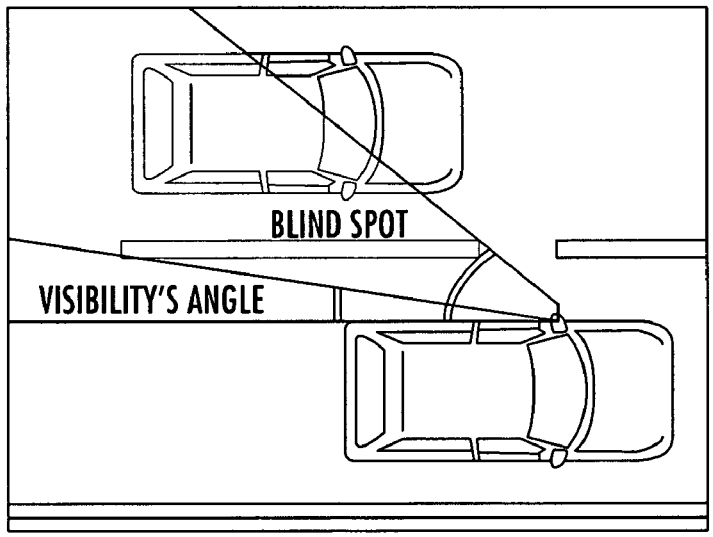
FIG. 20 shows the blind spot of a car driver in accordance with the present invention.

A device of the invention has been used in a system for aiding the driving of a car, in particular for monitoring the so-called blind spot area. In driving a car, there may be situations of potential danger and the purpose of aiding systems is to identify potentially dangerous situations and to signal them immediately so that the driver may take appropriate countermeasures. A recurrent situation is the passing of a vehicle, depicted in FIG. 20. When a vehicle is being passed by another vehicle there is a blind spot in the side mirror that may impede the driver from seeing the oncoming vehicle, and if the driver is unaware of it he may steer his own vehicle to change lanes. A system capable of monitoring the blind spot for detecting and alerting the driver of the presence of an approaching vehicle would be of great assistance and an effective tool for reducing accidents.

Figure 21:
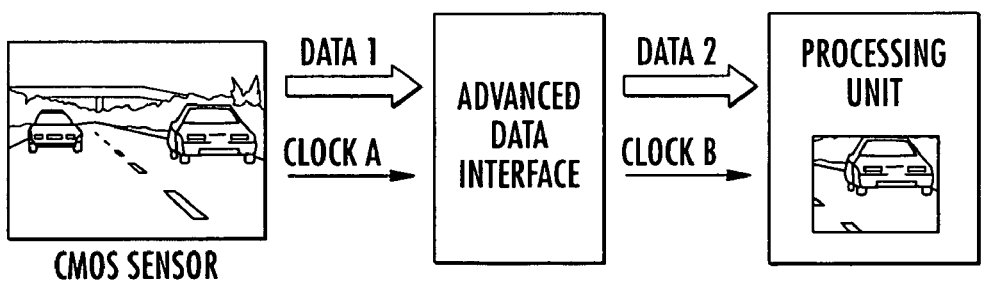
FIG. 21 depicts an example application of the selective transfer device ADVANCED DATA INTERFACE of FIG. 18.

Such a system greatly benefits from the present invention by employing a device for transferring selectively a sampled data stream at a certain clock frequency Clock A, relative to a video sequence, to a picture processing unit PROCESSING UNIT, as depicted in FIG. 21. Using a device of the invention the objective of transferring data from a video camera working with a clock of 24 MHz to a DSP functioning at 120 MHz while selecting in real time data pertaining to a portion of interest of each whole video frame to be transferred to the DSP thus allows the processing unit to process only the relevant portion of the video frames.

The device ADVANCED DATA INTERFACE may acquire encoded video data in nibble or parallel mode, for example, up to a maximum length of 10 bits (see FIG. 22), synchronized on the trailing, leading or both edges of the clock signal Clock A.

The video frame acquired by the device of the invention ADVANCED DATA INTERFACE is a pixel array of n columns and m rows. The internal register present in the device ADVANCED DATA INTERFACE locates, for each row, the first data and the last data to be transferred to the processing unit, thus extracting a predefined portion of each video frame defined by a generally polygonal window according to the method of extraction described above.

The definition of the polygonal window is made by providing row and column indices of the vertex data of the portion of frame of interest to dedicated internal registers of the ADVANCED DATA INTERFACE. A way of doing this includes in reading those values from an internal memory and processing them in real time with the processing unit itself, or alternatively with a dedicated device that calculates automatically the row and column indices of the border data.

The selection of the data of interest and the relative data transfer takes place as follows. Through the clock signal Clock A, the data are sampled after the enable bit has been written in the control register. Storage of the selected data in a circular buffer BUFFER composed of 16 locations (each location stores a data), starts when the value of a counter reaches the value stored in the register Start and finishes when the same value coincides to that loaded in the register End.

Transmission is performed by groups of data, the dimension of which is predefinable according to needs. The size of each group is defined by taking into consideration the working clock frequencies of the video camera and of the microprocessor of the processing unit to prevent risks due to a possible loss of data (Overflow).

Transmission of the selected data to the processing unit takes place after a DMA request or interrupt as soon as the pre-established number of data (Word) are in the buffer. After the transmission of each pixel, a read index (Read) is automatically updated, while a write index (Write) is incremented at each new pixel stored in the buffer.

The interface device of the invention provides the necessary information for monitoring the data stream. It outputs information about an eventual overwriting of data in the buffer, over-reading of pixels transmitted to the processing unit, and flags of pending interrupts. Besides providing these indications, the interface device may be made compatible with the particular format of the incoming video data and eventually, if necessary, for carrying out a preliminary re-organizing of the data. It is possible to disable automatically the sampling of input data, upon nullification of the general counter when it reaches the value stored in the register End, or it is possible to disable the enabling flag by a writing operation.

Figure 22:
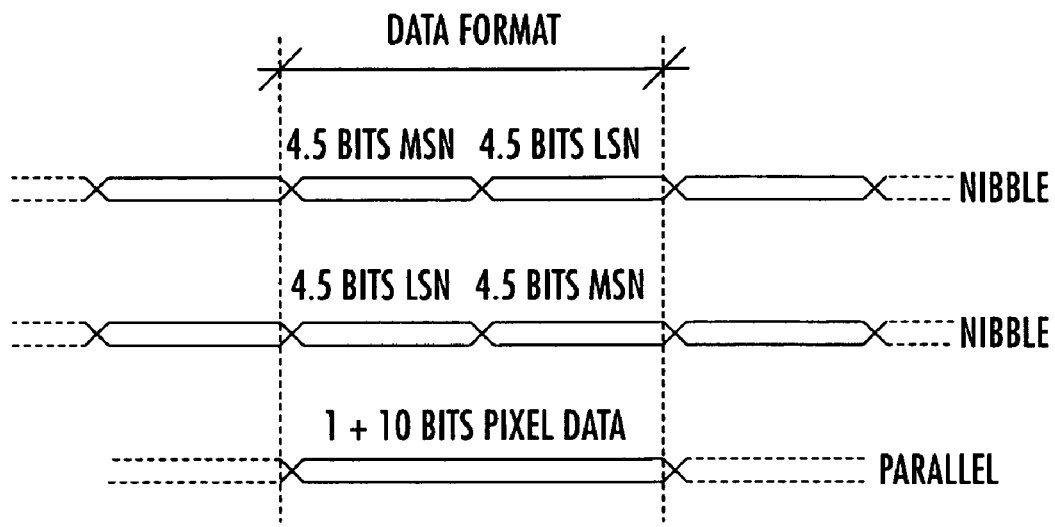
FIG. 22 shows three data transmission formats in accordance with the present invention.

The block RECEPTION CONTROLLER is the input interface with the video camera. This block acquires the encoded video data in a certain format, as depicted in FIG. 22. It may be configured for parallel or nibble format and the size of nibbles may be predefined as well as the succession (Most Significant Nibble or Least Significant Nibble) in which they must be provided. The block is also configurable for choosing which edge of the clock signal Clock A is used for sampling input data from the video camera. It is possible to choose as active edge of the clock either the trailing edge, or the leading edge or even both edges.

The acquired data are then transferred to the block DATA SELECTOR for the subsequent loading phase of selected pixels in the circular buffer where the requests for transmitting each block to the processing unit are generated.

The function of the block DATA SELECTOR is that of extracting the portion of video frames to be provided to the processing unit. The transfer of the selected data takes place by groups for optimizing performances. The block DATA SELECTOR is composed of a general counter (not depicted), a circular buffer and a group of internal registers:

Start: indicates after how many pixels of the row being scanned must be counted from the general counter before acquisition of pixel data in the circular buffer begins.

End: indicates after how many pixels of the row being scanned must be counted by the general counter before the acquisition of pixel data in the circular buffer is stopped.

Word: indicates the number of pixel data, that when all are loaded in the buffer activate a transfer request (via DMA or interrupt). At each multiple of this number a new transfer request is generated.

Write: indicates the position in the buffer where the currently selected pixel data are to be loaded. It is incremented upon loading each pixel.

Read: indicates the position in the buffer of the pixel data that will be read. It is incremented automatically upon reading at each pixel (via DMA or the processing unit).

Work: when asserted, it indicates that the enabling flag of the control register is enabled. It remains active as long as all pixels of a row comprised between the values defined in the registers Start and End have been acquired.

Over-read: indicates the number of data that are over-read in the last transfer group. This happens when the number of pixels to be transferred of the currently scanned row is not an exact multiple of the size of the groups of data for a single transfer (value of the Word register).

Overflow: indicates the accidental occurrence of an overwriting of pixels not yet read and stored in the buffer and not yet read with the consequential loss of them. Such an occurrence determines an error condition. In this situation it is advisable to reset the device by the dedicated register Reset, for properly restarting acquisition of the successive rows.

Control: this block enables the general counter and permits the configuration of the device. It enables data interrupts DMA requests (Direct Memory Access), signals overflow conditions (read only), enables overflow interrupts and automatic reset of the device when the acquisition ends.

Pending: in a read mode, it indicates whether a pending interrupt is present or not. In a write mode, it allows the interrupt to be cancelled.

Reset: it resets the circular buffer and the internal registers, except the Pending register that requires a dedicated write command.

Figure 24:
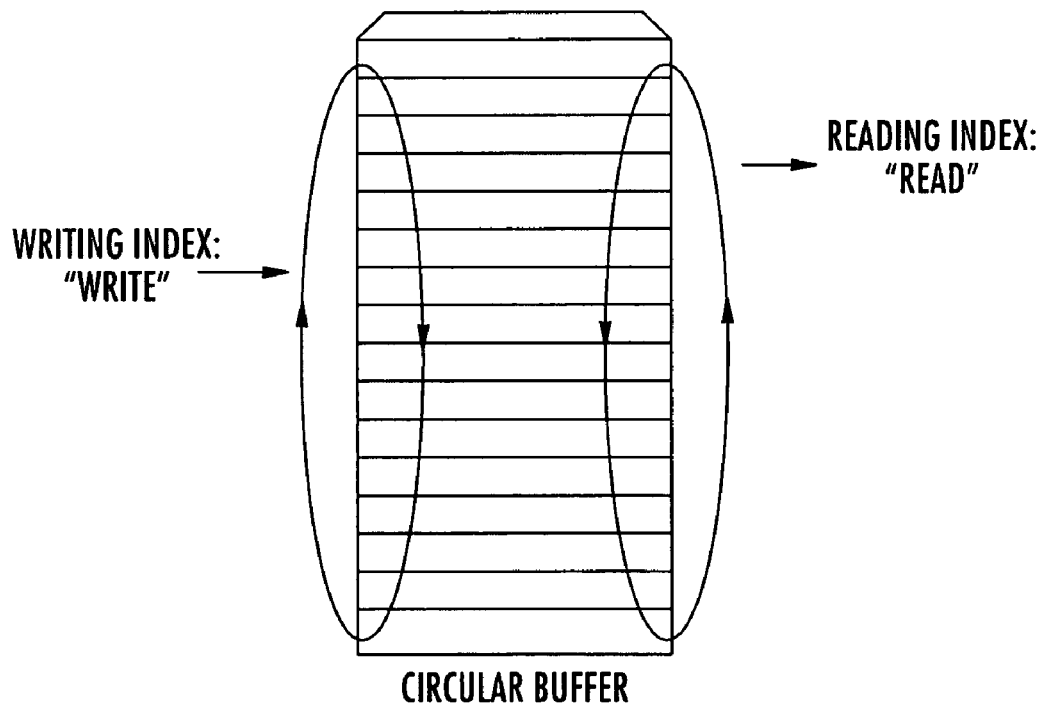
FIG. 24 shows the read and write indices of the circular buffer of the device of FIG. 19.
Figure 23:
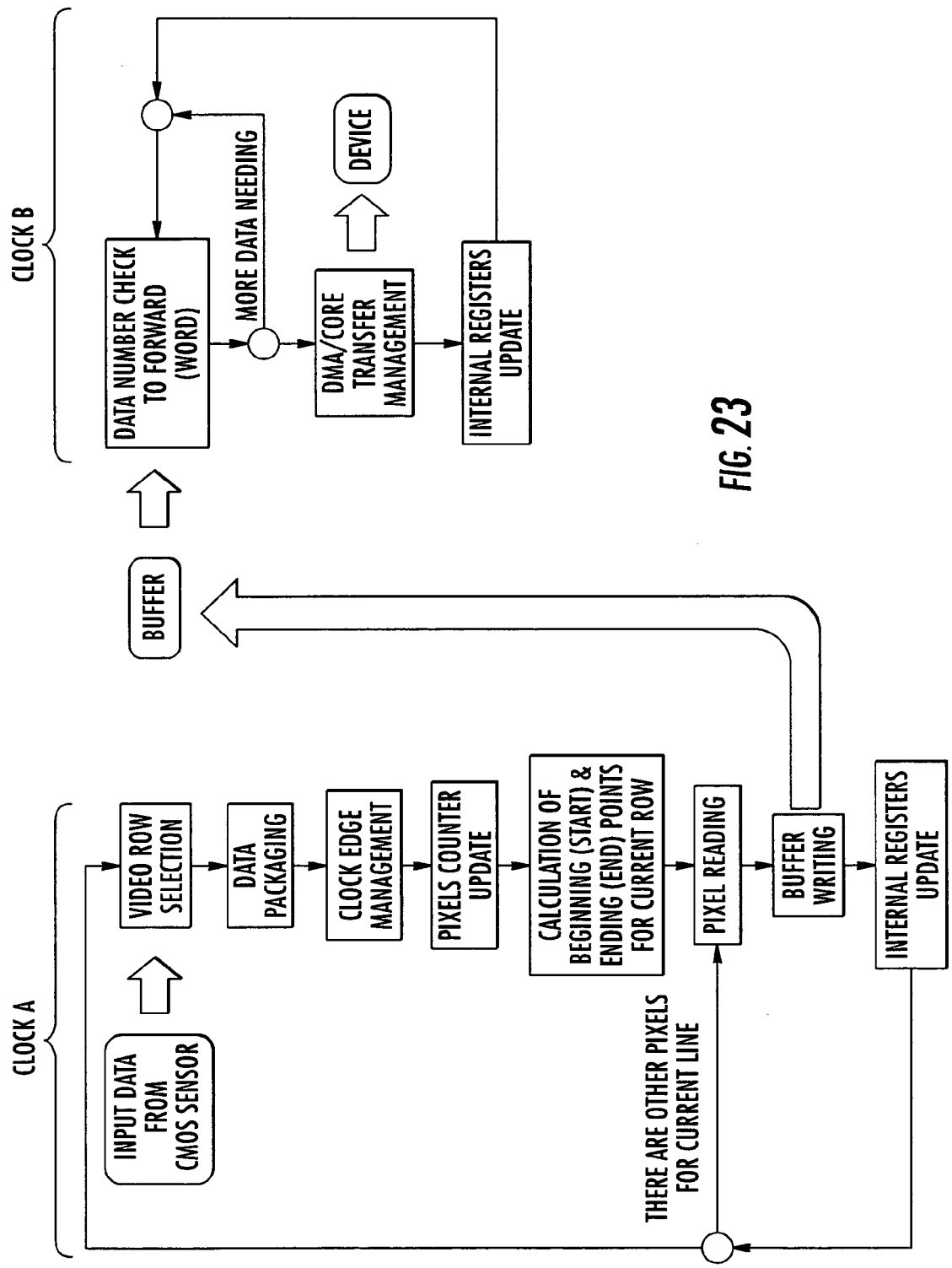
FIG. 23 illustrates the algorithm implemented by the device of FIG. 19.

The implemented algorithm is illustrated in FIG. 23. The counting performed by the general counter starts with the activation of the enabling bit of the device ADVANCED DATA INTERFACE and is incremented every time a pixel is provided by the block RECEPTION CONTROLLER. The buffer is circular and may include 16 locations, each capable of storing a pixel data, as shown in FIG. 24.

During a write operation, the pixel data are loaded in the buffer in the position indicated by the write index, which is the value of the register Write. The latter is updated as soon as a pixel is completely loaded. The pixel data pointed by the read index (value of the register Read) are read from this buffer at the address stored in the register Data-Acquire. At each read operation this index is incremented.

The block TRANSMISSION CONTROLLER interfaces directly with the processing unit and it synchronizes and transfers data, manages interrupts, DMA requests and implements the data read/write protocol of the processing unit.

The modular architecture of the device ADVANCED DATA INTERFACE is advantageous because it ensures the possibility of integrating it in different types of "embedded" systems. It offers a very flexible approach independent from the type of external devices to be interfaced.

In the example described, the device ADVANCED DATA INTERFACE provides an excellent tool for efficiently transferring video data from a CMOS video camera having a standard interface and a processing unit. The core of the device is represented by the blocks DATA SELECTOR and RECEPTION CONTROLLER. They remain unchanged while the block TRANSMISSION CONTROLLER may be for ensuring a correct implementation of the protocol of data exchange of the processing unit.

The device ADVANCED DATA INTERFACE has been implemented and integrated in a VLSI architecture based on the DSP-2420 device of Parthus Technologies. The functional architecture described in VHDL of the proposed approach has been tested as follows.

Video data output by a video sensor CMOS VV5500, produced by STMicroelectronics, have been selected and transferred through a DMA channel to an internal RAM. The functional model of the video sensor used provides data through the signals Frame Start (beginning of a video frame) and Line Start (beginning of a video row) that automatically enable certain interrupts to which the processing unit is sensitive to. The microprocessor in return initializes and enables the device ADVANCED DATA INTERFACE in which the selection of a certain portion (region) of each frame and transfer of the selected data pertaining to the region of interest are executed. The definition of the region of interest is performed by the processing unit through the signal Start and End according to the method of the invention.

The circular buffer, schematized by the vector bus, contains a pixel at each location. Each time the buffer is loaded with a pixel, the write index (register Write) is incremented. When the number of loaded pixels is equal to the value stored in the register Word a DMA request is activated (set signal). Successively, the DMA starts the transmission (reset signal asserted) resetting the signal set. At each transmission the read index (register Read) is incremented.

The invention claimed is:

1. A method for extracting a portion of data from an ordered set of data arrays, with each data array being organized in rows and columns, the method comprising:
    preliminarily establishing vertex data locations of the portion of data to be extracted from each data array;
    locating, as a function of row and column indices, coordinates identifying the vertex data locations of the portion of data to be extracted, and identifying the vertex data location with a largest row index and the vertex data location with a smallest row index;
    scanning rows of data between the largest row index and the smallest row index, and identifying border data of the portion of data to be extracted by
        calculating differences between the column indices and between the row indices for each pair of consecutive vertex data locations,
        approximating to a smallest absolute value of the calculated differences with a power in base two raised to an integer exponent, and calculating an integer incremental ratio by truncating any decimal of the integer incremental ratio between the differences of a largest absolute value and the power in base two raised to an integer exponent, and
        identifying border data locations of the portion of data to be extracted on the row being scanned belonging to a perimeter segment joining the pair of vertices as a function of the integer incremental ratio; and
    extracting the portion of data bordered by the border data belonging to the perimeter segment and the pairs of vertices.

2. A method according to claim 1, wherein the locating is performed in either a clockwise or counterclockwise direction; and wherein calculating the differences is performed in either a clockwise or counterclockwise direction.

3. A method according to claim 1, wherein calculating the integer incremental ratio further comprises:
    representing the largest absolute value with a binary string; and
    right shifting the binary string by a number of bits corresponding to the integer exponent.

4. A method according to claim 1, wherein identifying the border data locations further comprises:
    identifying the vertex data location pertaining to the perimeter segment having the smallest row index and storing its column and row indices; and
    scanning the rows that intercept the perimeter segment starting from the row with the smallest row index and for each row identifying a border data location.

5. A method according to claim 4, wherein the scanning comprises:
    selecting the vertex data as border data and considering a next row for rows containing vertex data of the perimeter segment, otherwise
    verifying whether the absolute value of the difference between column indices exceeds or is equal to the absolute value of the difference between row indices by
        calculating the integer incremental ratio, storing as a column index of another border data the column index larger or smaller than the column index of a last identified border data by a quantity equal to the integer incremental ratio, depending on whether the sign of the integer incremental ratio is positive or negative, respectively, and carrying out iteratively the following operations until a row containing a vertex data is reached by
        calculating a new value of the difference among column indices by decrementing or incrementing it depending on whether the integer incremental ratio is positive or negative, respectively, and decrementing by one the difference between row indices, and calculating a new value of the integer incremental ratio using the new difference between column indices,
        incrementing by one a currently stored row index and identifying as border data the data pointed by the currently stored row and column indices, and
        incrementing or decrementing depending on whether the integer incremental ratio is positive or negative, respectively, the currently stored column index by a new value of the integer incremental ratio.

6. A method according to claim 5, wherein if the absolute value of the difference between the column indices is not verified, then further comprising:
    calculating the integer incremental ratio and carrying out iteratively the following until the absolute value of the integer incremental ratio becomes null or the scanned row does not contain a vertex data
        incrementing by one the index of the currently scanned row, decrementing by one the difference between row indices, and selecting as border data for the current row the data pointed by the currently stored row and column indices, decrementing by one the absolute value of the integer incremental ratio, and decrementing by one the absolute value of the difference between column indices if the absolute value of the integer incremental ratio is null, incrementing or decrementing by one the currently stored column index depending on whether the difference between column indices is positive or negative, respectively.

7. A method according to claim 1, wherein the integer exponent is obtained by truncating the logarithm in base two of the smallest absolute value.

8. A method according to claim 7, wherein the truncation is performed by a fuzzy logic algorithm.

9. A method according to claim 8, wherein the fuzzy logic algorithm generates fuzzy values determined by triangular member-functions.

10. A device for extracting a portion of data from a data array organized in rows and columns, the device comprising:
a logic elaboration circuit receiving as input a data stream identifying vertex data of the portion of data to be extracted, and generating a data stream relative to the extracted portion of data;
an input interface for providing the data stream to said logic elaboration circuit;
an output interface for outputting the data stream relating to the extracted portion of data generated by said logic elaboration circuit;
a memory for storing values of variables used by said logic elaboration circuit;
a divider coupled to said logic elaboration circuit for calculating a ratio between two integer numbers; and
said logic elaboration circuit cooperating with said input and output interfaces, said memory and said divider for generating the data stream relative to the extracted portion of data by
preliminarily establishing vertex data locations of the portion of data to be extracted from each data array;
locating, as a function of row and column indices, coordinates identifying the vertex data locations of the portion of data to be extracted, and identifying the vertex data location with a largest row index and the vertex data location with a smallest row index;
scanning rows of data between the largest row index and the smallest row index, and identifying border data of the portion of data to be extracted by
calculating differences between the column indices and between the row indices for each pair of consecutive vertex data locations,
approximating to a smallest absolute value of the calculated differences with a power in base two raised to an integer exponent, and calculating an integer incremental ratio by truncating any decimal of the integer incremental ratio between the differences of a largest absolute value and the power in base two raised to an integer exponent, and
identifying border data locations of the portion of data to be extracted on the row being scanned belonging to a perimeter segment joining the pair of vertices as a function of the integer incremental ratio; and
extracting the portion of data bordered by the border data belonging to the perimeter segment and the pairs of vertices.

11. A device according to claim 10, wherein said logic elaboration circuit performs the locating in either a clockwise or counterclockwise direction, and also performs the calculating in either a clockwise or counterclockwise direction.

12. A device according to claim 10, wherein said divider comprises a shift register for calculating the integer incremental ratio by
representing the largest absolute value with a binary string; and
right shifting the binary string by a number of bits corresponding to the integer exponent.

13. A device according to claim 10, wherein said logic elaboration circuit identifies the border data locations by
identifying the vertex data location pertaining to the perimeter segment having the smallest row index and storing its column and row indices; and
scanning the rows that intercept the perimeter segment starting from the row with the smallest row index and for each row identifying a border data location.

14. A device according to claim 13, wherein the scanning by said logic elaboration circuit comprises:
selecting the vertex data as border data and considering a next row for rows containing vertex data of the perimeter segment, otherwise
verifying whether the absolute value of the difference between column indices exceeds or is equal to the absolute value of the difference between row indices by
calculating the integer incremental ratio, storing as a column index of another border data the column index larger or smaller than the column index of a last identified border data by a quantity equal to the integer incremental ratio, depending on whether the sign of the integer incremental ratio is positive or negative, respectively, and carrying out iteratively the following operations until a row containing a vertex data is reached by
calculating a new value of the difference among column indices by decrementing or incrementing it depending on whether the integer incremental ratio is positive or negative, respectively, and decrementing by one the difference between row indices, and calculating a new value of the integer incremental ratio using the new difference between column indices,
incrementing by one a currently stored row index and identifying as border data the data pointed by the currently stored row and column indices, and
incrementing or decrementing depending on whether the integer incremental ratio is positive or negative, respectively, the currently stored column index by a new value of the integer incremental ratio.

15. A device according to claim 14, wherein if the absolute value of the difference between the column indices is not verified, then said logic elaboration circuit further performs:
calculating the integer incremental ratio and carrying out iteratively the following until the absolute value of the integer incremental ratio becomes null or the scanned row does not contain a vertex data by
incrementing by one the index of the currently scanned row, decrementing by one the difference between row indices, and selecting as border data for the current row the data pointed by the currently stored row and column indices,
decrementing by one the absolute value of the integer incremental ratio, and decrementing by one the absolute value of the difference between column indices if the absolute value of the integer incremental ratio is null, incrementing or decrementing by one the currently stored column index depending on whether the difference between column indices is positive or negative, respectively.

16. A device according to claim 10, wherein said logic elaboration circuit obtains the integer exponent by truncating the logarithm in base two of the smallest absolute value.

17. A device according to claim 16, wherein said logic elaboration circuit comprises a fuzzy logic algorithm for performing the truncation.

18. A device according to claim 17, wherein the fuzzy logic algorithm generates fuzzy values determined by triangular member-functions.

* * * * *

UNITED STATES PATENT AND TRADEMARK OFFICE
CERTIFICATE OF CORRECTION

PATENT NO. : 7,333,675 B2  
APPLICATION NO. : 10/937808  
DATED : February 19, 2008  
INVENTOR(S) : Angrilli et al.

Page 1 of 1

It is certified that error appears in the above-identified patent and that said Letters Patent is hereby corrected as shown below:

Column 7, Line 43

Delete: " $m_y = \dfrac{|\Delta y|}{|\Delta x|} = \dfrac{2}{1} = \dfrac{"10"}{2^0} = "10" = 2$ "

Insert: -- $m_y = \dfrac{|\Delta y|}{|\Delta x|} = \dfrac{2}{1} \cong \dfrac{"10"}{2^0} = "10" = 2$ --

Column 11, Line 6

Delete: "C_line"  
Insert: -- c_line --

Column 12, Line 17

Delete: "memberships"  
Insert: -- membership --

Column 14, Line 18

Delete: "free continue"  
Insert: -- free to continue --

Signed and Sealed this

Sixteenth Day of September, 2008

JON W. DUDAS  
*Director of the United States Patent and Trademark Office*